(12) United States Patent
Tang et al.

(10) Patent No.: US 9,690,075 B2
(45) Date of Patent: Jun. 27, 2017

(54) OPTICAL IMAGE CAPTURING SYSTEM

(71) Applicant: ABILITY OPTO-ELECTRONICS TECHNOLOGY CO. LTD., Taichung (TW)

(72) Inventors: Nai-Yuan Tang, Taichung (TW); Yeong-Ming Chang, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 0 days.

(21) Appl. No.: 14/584,485

(22) Filed: Dec. 29, 2014

(65) Prior Publication Data

US 2016/0091694 A1  Mar. 31, 2016

(30) Foreign Application Priority Data

Sep. 26, 2014 (TW) .............................. 103133425 A

(51) Int. Cl.
  *G02B 13/18* (2006.01)
  *G02B 3/02* (2006.01)
  *G02B 13/00* (2006.01)

(52) U.S. Cl.
  CPC ....... *G02B 13/0045* (2013.01); *G02B 13/002* (2013.01)

(58) Field of Classification Search
  CPC ...... G02B 13/0045; G02B 9/62; G02B 13/18; G02B 9/64; G02B 13/002; H04N 5/225
  USPC .......................................... 359/756, 757, 713
  See application file for complete search history.

(56) References Cited

U.S. PATENT DOCUMENTS

| | | | |
|---|---|---|---|
| 2012/0188654 A1* | 7/2012 | Huang | G02B 9/62 359/713 |
| 2012/0243108 A1* | 9/2012 | Tsai | G02B 13/18 359/713 |
| 2014/0240852 A1* | 8/2014 | Hsu | G02B 13/0045 359/713 |

* cited by examiner

*Primary Examiner* — Alicia M Harrington
(74) *Attorney, Agent, or Firm* — Muncy, Geissler, Olds & Lowe, P.C.

(57) ABSTRACT

A six-piece lens for capturing image and a six-piece optical module for capturing image are provided. In order from an object side to an image side, the lens along the optical axis comprises a first lens with positive refractive power having a convex object-side surface; a second lens with refractive power; a third lens with refractive power; a fourth lens with refractive power; a fifth lens with refractive power; and a sixth lens with negative refractive power having a concave image-side surface; and at least one of the image-side surface and object-side surface of each of the six lens elements are aspheric. The optical lens can increase aperture value and improve the imagining quality for use in compact cameras.

25 Claims, 15 Drawing Sheets

OPTICAL IMAGE CAPTURING SYSTEM

CROSS-REFERENCE TO RELATED APPLICATION

This application claims priority from Taiwan Patent Application No. 103133425, filed on Sep. 26, 2014, in the Taiwan Intellectual Property Office, the content of which are hereby incorporated by reference in their entirety for all purposes.

BACKGROUND OF THE INVENTION

1. Field of the Invention

The present invention relates to an optical image capturing system, in particular with respect to a miniaturized optical image capturing system applied to electronic product.

2. Description of the Related Art

Recently, with the thriving and robust of portable electronic product having recording function, needs for optical system increases gradually. The charge coupled device of general optical system is nothing else but charge coupled device (CCD) or complementary metal-oxide semiconductor sensor (CMOS sensor), and with the burgeoning development of semiconductor manufacturing process, pixel size of charge coupled device shortens, and the optical system is directed towards the development of the field of high pixel, and thus, needs for imaging quality increase.

The conventional optical systems embedded to the portable device mostly belong to four-piece or five-piece lens structure, and as those portable devices keep enhancing the pixels, consumers have more and more desires for larger aperture such as functions of low-light level and night vision imaging, or needs for wild field of view, for example, auto heterodyne function. However, the optical system with larger aperture often encounters situations pertaining to obstacles to more aberrations leading to a worse peripheral imaging quality and difficulty in manufacturing process, and design of the optical system with wild field of view has technical problem of increasing imaging distortion. As a result, the known optical image capturing system is not able to satisfy with a higher level demand of photography anymore.

Therefore, besides further promoting quality of the total image pixels as well as giving consideration to the balanced design of microminiaturization optical image capturing lens, how to boost the exposure value of optical image capturing lens and widen the field of view thereof has become a crucial issue.

SUMMARY OF THE INVENTION

Aspects of embodiments of the present invention aim to an optical image capturing system and an optical image capturing lens which are able to use a combination of six lenses having refractive power and convex and concave optical surfaces (on principle, convex and concave optical surfaces mentioned in the present invention are used to describe geometrical form of object-side or image-side surface of each lens on the optical axis), so that exposure value of the optical image capturing system can thereby be boosted and field of view of optical image capturing lens is widened; in the meanwhile, quality of the total image pixels of images is promoted and thereby is applied to smaller electronic product.

Terms and reference numerals of the lens parameters involved in embodiments of the present invention are explained as follows for the follow-up reference:

The Lens Parameter Regarding Length or Height

HOI denotes imaging height of the optical image capturing system; HOS denotes height of the optical image capturing system; InTL denotes a distance from object-side surface of first lens to image-side surface of the sixth lens of the optical image capturing system; InB denotes a distance from the object-side surface of the sixth lens to the image-plane of the optical image capturing system; InS denotes a distance from an aperture stop(aperture) to the image-plane of the optical image capturing system; In12 denotes a distance from the first lens to the second lens of the optical image capturing system (example), and TP1 denotes a thickness of the first lens on the optical axis of the optical image capturing system (example).

The Lens Parameter Regarding Materials

NA1 denotes an Abbe number of the first lens of the optical image capturing system (example), and Nd1 denotes infraction index of the first lens (example).

The Lens Parameter Regarding Field of View

AF denotes field of view, HAF denotes a half of the field of view, and MRA denotes a major light angle.

The Lens Parameter Regarding Exit Pupil and Entrance Pupil

HEP denotes entrance pupil diameter of the optical image capturing lens system.

The Parameter Regarding Depth of Lens Surface Shape

InRS61 denotes a horizontal translation distance from the intersection point of the object-side surface of the sixth lens on the optical axis to the maximal effective diameter position of the object-side surface of the sixth lens on the optical axis (example); InRS62 denotes a horizontal translation distance from the intersection point of the image-side surface of the sixth lens on the optical axis to the maximal effective diameter position of the image-side surface of the sixth lens on the optical axis (example); Inf61 denotes a horizontal distance from the intersection point of the object-side surface of the sixth lens on the optical axis to the inflection point of the object-side surface of the sixth lens on the optical axis (example), and Inf62 denotes a horizontal distance from the intersection point of the image-side surface of the sixth lens on the optical axis to the inflection point of the image-side surface of the sixth lens on the optical axis (example).

The Parameter Regarding Lens Surface Shape

A critical point denotes a crossing with a tangent plane vertical to the optical axis except for the intersection point on the optical axis. For example, HVT51 denotes a vertical distance between the critical point of the object-side surface of the fifth lens and the optical axis; HVT52 denotes a vertical distance between the critical point of the image-side surface of the fifth lens and the optical axis; HVT61 denotes a vertical distance between the critical point of the object-side surface of the sixth lens and the optical axis, and HVT62 denotes a vertical distance between the critical point of the image-side surface of the sixth lens and the optical axis.

The Variable Regarding Aberration

ODT denotes the optical distortion of the optical image capturing system, TDT denotes TV distortion thereof. Further, the range of the aberration offset for the view of image formation may be limited to 50%~100% field; DFS denotes offset amount of spherical aberration, and DFC denotes offset amount of comet.

The present invention provides an optical image capturing system, and an object-side surface or an image-side surface of the sixth lens has inflection points which is able to effectively adjust the incidence angle of the sixth lens in each field of view, and to correct the optical and TV distortions. In addition, surface of the sixth lens may have a better optical path adjustment function to promote imaging quality.

The present invention is to provide an optical image capturing system, in order from an object side to an image side which may comprise: a first lens, a second lens, a third lens, a forth lens, a fifth lens and a sixth lens. The first lens may have positive refractive power and the sixth lens may have refractive power. Both the object-side and image-side surfaces of the first lens and the sixth lens may be aspheric, and focal lengths from the first lens to the sixth lens may be respectively f1, f2, f3, f4, f5 and f6, focal length of the optical image capturing system may be f, an entrance pupil diameter of the optical image capturing system may be HEP, a half of the maximal view angle of the optical image capturing system may be HAF, a distance from the object-side surface of the first lens to the image-plane may be HOS, and the following conditions may be satisfied: $0 \leq |f/f1| \leq 2$; $1.2 \leq f/HEP \leq 2.8$; $0.4 \leq |\tan(HAF)| \leq 1.5$; and $0.5 \leq HOS/f \leq 2.5$.

The present invention is further to provide another optical image capturing system, in order from an object side to an image side which may comprise: a first lens, a second lens, a third lens, a forth lens, a fifth lens and a sixth lens. The first lens may have positive refractive power and both the object-side and image-side surfaces thereof may be aspheric, and the object-side surface close to the optical axis may be a convex surface. The second lens may have negative refractive power, the third lens may have refractive power, the fourth lens may have refractive power, the fifth lens may have refractive power, and the sixth lens may have refractive power, and both object-side and image-side surfaces of the first and the sixth lenses may be aspheric, and focal lengths from the first lens to the sixth lens may be respectively f1, f2, f3, f4, f5 and f6, focal length of the optical image capturing system may be f, an entrance pupil diameter of the optical image capturing system may be HEP, a half of the maximal view angle of the optical image capturing system may be HAF, a distance from the object-side surface of the first lens to the image-plane may be HOS, when the optical image capturing system is imaging, TV distortion and optical distortion may be respectively TDT and ODT, and the following conditions may be satisfied: $0 \leq |f/f1| \leq 2$; $1.2 \leq f/HEP \leq 2.8$; $0.4 \leq |\tan(HAF)| \leq 1.5$; $0.5 \leq HOS/f \leq 2.5$; $|TDT| < 1.5\%$; and $|ODT| \leq 2.5\%$.

The present invention is further to provide another optical image capturing system, in order from an object side to an image side which may comprise: a first lens, a second lens, a third lens, a forth lens, a fifth lens and a sixth lens. The first lens may have positive refractive power and both the object-side and image-side surfaces thereof may be aspheric, and the object-side surface close to the optical axis may be a convex surface. The second lens may have negative refractive power, the third lens may have positive refractive power, the fourth lens may have refractive power, the fifth lens may have refractive power, and the sixth lens may have negative refractive power, and both object-side and image-side surfaces of the sixth lens may be aspheric, and the object-side surface close to the optical axis may be a concave surface. The focal lengths from the first lens to the sixth lens may be respectively f1, f2, f3, f4, f5 and f6, focal length of the optical image capturing system may be f, an entrance pupil diameter of the optical image capturing system may be HEP, a half of the maximal view angle of the optical image capturing system may be HAF, a distance from the object-side surface of the first lens to the image-plane may be HOS, and when the optical image capturing system is imaging, optical distortion may be ODT and TV distortion may be TDT, and the following conditions may be satisfied: $0 \leq |f/f1| \leq 2$; $1.2 \leq f/HEP \leq 2.8$; $0.45 \leq |\tan(HAF)| \leq 1.5$; $0.5 \leq HOS/f \leq 2.5$; $|TDT| < 1.5\%$; and $|ODT| \leq 2.5\%$.

The aforementioned optical image capturing system may cooperate with an image sensing element which may have a diagonal line about 1/1.2 inch when imaging, and the size of the image sensing element may be better by 1/2.3 inch, and pixel size of the image sensing element may be less than 1.4 μm, preferably less than 1.12 μm, and excellent less than 0.9 μm. In addition, the optical image capturing system may be applicable to the image sensing element with aspect ratio by 16:9.

The aforementioned optical image capturing system may be suitable to the recording requirement for more than ten million pixels (e.g. 4K2K, or UHD, QHD) and may have excellent imaging quality.

The height of optical system (HOS) may be applicable to be shortened when in the condition of $|f1| > f6$ so as to accomplish the goal of microminiaturization.

When $|f/f1|$ satisfies with the preceding conditions, displacement of the first lens' refractive power is better and is able to avoid causing large aberration such that cannot be corrected, and when in the condition of $|f2|+|f3|+|f4|+f5| > |f1|+|f6|$, it uses at least one of the second lens to the fifth lens that has weak positive refractive power or weak negative refractive power. The so-called weak refractive power means that the absolute value of focal length of the specific lens is larger than 10. When at least one of the second lens to the fifth lens of the present invention has weak positive refractive power, it may be able to share the positive refractive power of the first lens so as to avoid the unnecessary aberration occurring too early; to the contrary, if at least one of the second lens to the fifth lens of the present invention has weak negative refractive power, the aberration of the system can thereby be fine-tuned and corrected.

The sixth lens may have negative refractive power, and image-side surface thereof may be a concave surface which may benefit from shortening the rear focal length to maintain the miniaturization. Additionally, at least one surface of the sixth lens may have at least one inflection point which is able to suppress the off-axis incident angle of the light in field of view so that the caused aberration can be corrected.

BRIEF DESCRIPTION OF THE DRAWINGS

Hereinafter, embodiments of the present invention will be described in detail with reference to the accompanying drawings so that those skilled in the art to which the present invention pertains can realize the present invention, wherein.

DETAILED DESCRIPTION OF THE PREFERRED EMBODIMENTS

Figure 1A:
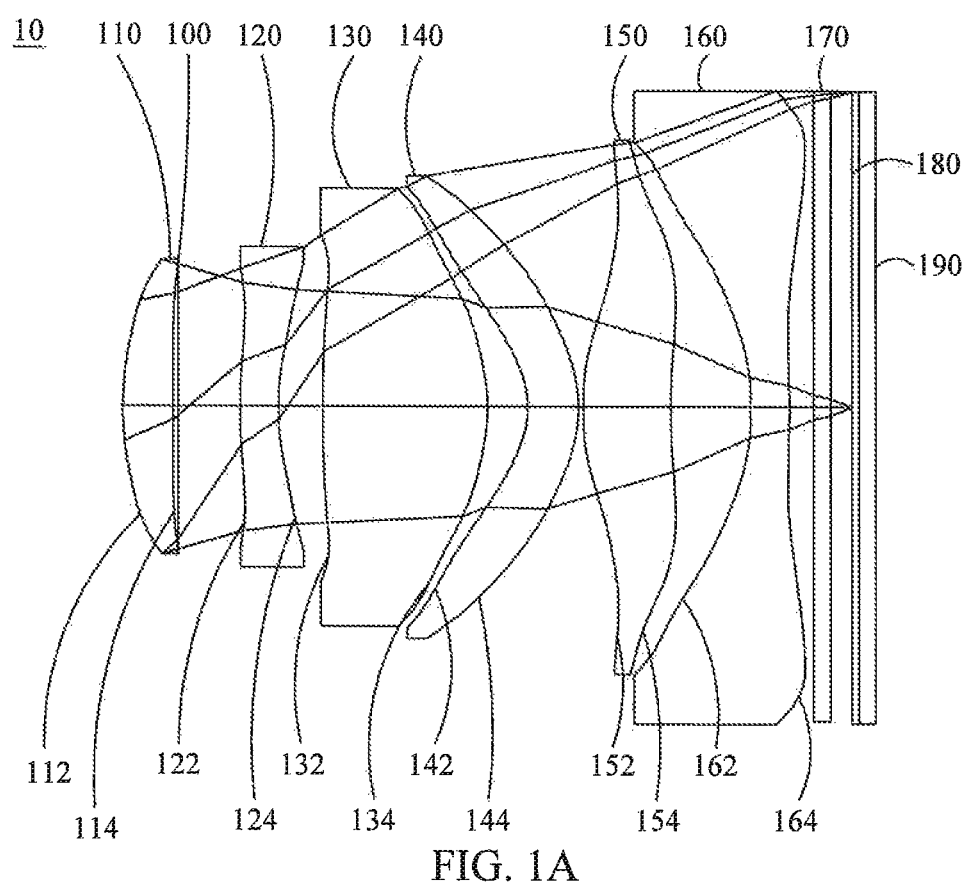
FIG. 1A is a schematic diagram of the first embodiment of an optical image capturing system according to the present invention.

An optical image capturing system, in order from an object side to an image side comprising: a first lens, a second lens, a third lens, a fourth lens, a fifth lens and sixth lens having refractive power. The optical image capturing system may further comprise an image sensing element disposed on an image-plane.

The optical image capturing system uses five working wavelengths, which are 470 nm, 510 nm, 555 nm, 610 nm and 650 nm, respectively, wherein 555 nm is served as the primary wavelength.

A ratio f/fp between focal length f of the optical image capturing system and a focal length fp of each lens having positive refractive power is PPR, a ratio f/fn between focal length f of the optical image capturing system and a focal length fp of each lens having negative refractive power is NPR, a sum of the PPR of all the lenses having positive refractive power is ΣPPR, a sum of the NPR of all the lenses having negative refractive power is ΣNPR, and it contributes to the control of the total refractive power and total length of the optical image capturing system when the following condition is satisfied: 0.5≤ΣPPR/|ΣNPR|≤2.5, and preferably, the following condition is satisfied: 1≤ΣPPR/|ΣNPR|≤2.0.

Height of the optical image capturing system is HOS, and when a ratio HOS/f is close to 1, it contributes to manufacturing microminiaturized optical image capturing system having ultra-high pixel images.

Regarding an embodiment of an optical image capturing system of the present invention, the first, second, third, fourth and fifth lenses all have positive refractive power, and focal length of the first lens is f1, focal length of the third lens is f3, focal length of fourth lens is f4 and focal length of fifth lens is f5, and the conditions are satisfied: 0<(f/f1)+(f/f3)+(f/f4)+(f/f5)≤5; and f1/(f1+f3+f4+f5)≤0.85. Preferably, the conditions are satisfied: 0<(f/f1)+(f/f3)+(f/f4)+(f/f5)≤4.0; and 0.01<f1/(f1+f4+f5)≤0.2. As a result, it contributes to the control of focusing ability of the optical image capturing system, and is able to adequately distribute the positive refractive power of the system to suppress the obvious aberration occurring too early.

The first lens has positive refractive power, and object-side is convex and image-side surfaces may be concave. Consequently, it can be used to adequately adjust strength of the first lens's positive refractive power and contribute to shortening the total lengthens of the optical image capturing system.

The second lens may have negative refractive power, image-side surface thereof may be concave, and it can thereby correct the aberration caused by the first lens.

The third lens may have negative refractive power, object-side surface thereof may be convex, and it can thereby correct the aberration caused by the first lens.

The fourth lens may have positive refractive power, image-side surface thereof may be convex, and it can thereby share the positive refractive power of the first lens to avoid the aberration increasing overly and to decrease the sensitivity of the optical image capturing system.

The fifth lens may have negative refractive power and is able to share the positive refractive power of the first lens, and to effectively adjust the incidence angle of the fifth lens in each field of view to improve the aberration.

The sixth lens may have negative refractive power, image-side surface thereof may be concave, and it contributes to shortening the back focus length to maintain miniaturization. In addition, at least one surface of the sixth lens has at least one inflection point which is able to effectively suppress the off-axis incident angle of the light in field of view so that the caused aberration can be corrected. Preferably, object-side and image-side surfaces of the sixth lens both have at least one inflection point.

The optical image capturing system further comprises an image sensing element disposed on the image-plane. Half of diagonal line of an effective detection field of the image sensing element (i.e. imaging height, or the maximal image height of the optical image capturing system) is HOI, a distance from the object-side surface of the first lens to the image-plane on the optical axis is HOS, and the following conditions are satisfied: HOS/HOI ≤3; and 0.5≤HOS/f≤2.5. Preferably, the following are satisfied: 1≤HOS/HOI≤2.5; and 1≤HOS/f≤2. As a result, it can maintain the miniaturization of the optical image capturing system so as to be applied to the thin and portable electronic product.

Additionally, in the optical image capturing system, it can dispose at least one aperture according to needs to reduce stray light so as to promote the image quality.

According to an optical image capturing system of the present invention, the aperture is arranged as a front or middle one, wherein the front aperture means that the aperture is disposed between a to-be-shot object and the first lens, the middle aperture is to be mounted between the first lens and the image-plane. If the aperture is a front one, it enables to produce a longer distance between the exit pupil and the image-plane of the optical image capturing system so as to accommodate more optical elements, as well as increasing the efficiency of the image sensing element receiving images; if it is a middle aperture, it helps widening the angle of the field of view of the system, enabling the optical image capturing system having advantage of wide angle lens. A distance from the preceding aperture to the image-plane is InS, and the following condition is satisfied: 0.6≤InS/HOS≤1.1, and preferably, the following condition is satisfied: 0.8≤InS/HOS≤1. As a result, it can give consideration of maintaining the miniaturization of the optical image capturing system along with the characteristic of having advantage of wide angle lens.

According to an optical image capturing system of the present invention, a distance from the object-side surface of the first lens to the image-side surface of the sixth lens is InTL, and a thickness sum of all the lenses having refractive power on the optical axis is ΣTP, and the following condition is satisfied: 0.45≤ΣTP/InTL≤0.95. Consequently, it can take care of the contrast ratio while the system is imaging and the yield rate when manufacturing the lenses to provide adequate back focal length to accommodate other elements.

Curvature radius of the object-side surface of the first lens is R1, curvature radius of the image-side surface of the first lens is R2, and the following condition is satisfied: 0.01≤|R1/R2|≤0.5. Therefore, when the first lens has adequate positive refractive power strength, the spherical aberration is avoided to increase too fast. And preferably, the following condition is satisfied: 0.01≤|R1/R2|≤0.4.

Curvature radius of the object-side surface of the sixth lens is R11, curvature radius of the image-side surface of the sixth lens is R12, and the following condition is satisfied: −20<(R11−R12)/(R11+R12)<30. Therefore, it contributes to the correction of the aberration caused by the optical image capturing system.

An distance between the first and the second lenses on the optical axis is IN12, and the following condition is satisfied: 0<IN12/f≤0.25, and preferably, the following condition is satisfied: 0.01≤IN12/f≤0.20. Therefore, it contributes to the improvement in lenses' chromatic aberration so as to increase its performance.

Thicknesses of the first and the second lenses on the optical axis are respectively TP1 and TP2, and the following condition is satisfied: 1≤(TP1+IN12)/TP2≤10. Therefore, it contributes to controlling sensitivity of manufacture of the optical image capturing system and increase the performance.

Thicknesses of the fifth and the sixth lenses on the optical axis are respectively TP5 and TP6, an distance from the preceding two lenses is IN56, and the following condition is satisfied: 0.2≤(TP6+IN56)/TP5≤5. Therefore, it contributes to controlling sensitivity of manufacture of the optical image capturing system and reduces the total height of the system.

Thicknesses of the third, fourth and the fifth lenses on the optical axis are respectively TP3, TP4 and TP5; an distance between the third and the fourth lenses on the optical axis is IN34, an distance between the fourth and the fifth lenses on the optical axis is IN45, a distance from the object-side surface of the first lens to the image-side surface of the sixth lens is InTL, and the following condition is satisfied: 0.1≤(TP3+TP4+TP5)/ΣTP≤0.8, and preferably, the following condition is satisfied: 0.3≤(TP3+TP4+TP5)/ΣTP≤0.8. Therefore, it contributes to slightly correcting the aberration caused in the process of incident light traveling and reduces the total height of the system.

A horizontal translation distance from the intersection point of the object-side surface of the fifth lens on the optical axis to the maximal effective diameter position of the object-side surface of the fifth lens on the optical axis is InRS51 (if the horizontal displacement is toward the image-side surface, InRS61 is a positive value, and if the horizontal displacement is toward the object-side surface, InRS51 is a negative value), a horizontal translation distance from the intersection point of the image-side surface of the fifth lens on the optical axis to the maximal effective diameter position of the image-side surface of the fifth lens on the optical axis is InRS52, a thickness of the fifth lens on the optical axis is TP5, and the following condition is satisfied: 0<|InRS52|/TP5≤5. Therefore, it contributes to the manufacture and formation of lenses, and effectively maintains the minimization of the system.

A vertical distance from a critical point of the object-side surface of the fifth lens to the optical axis is HVT51, a vertical distance from a critical point of the image-side surface of the fifth lens to the optical axis is HVT52, and the following condition is satisfied: 0≤HVT51/HVT52. Therefore, it corrects the aberration in the off-axis field of view effectively.

A horizontal translation distance from the intersection point of the object-side surface of the sixth lens on the optical axis to the maximal effective diameter position of the object-side surface of the sixth lens on the optical axis is InRS61, a horizontal translation distance from the intersection point of the image-side surface of the sixth lens on the optical axis to the maximal effective diameter position of the image-side surface of the sixth lens on the optical axis is InRS62, a thickness of the sixth lens on the optical axis is TP6, and the following condition is satisfied: 0<|InRS62|/TP6<3. Therefore, it contributes to the manufacture and formation of lenses, and effectively maintains the minimization of the system.

A vertical distance from a critical point of the object-side surface of the sixth lens to the optical axis is HVT61, a vertical distance from a critical point of the image-side surface of the sixth lens to the optical axis is HVT62, and the following condition is satisfied: 0≤HVT61/HVT62. Therefore, it corrects the aberration in the off-axis field of view effectively.

An optical image capturing system of the present invention satisfies with the following condition: 0.2≤HVT62/HOI≤0.9, and preferably, the following condition is satisfied: 0.3≤HVT62/HOI≤0.8. Therefore, it contributes to the aberration correction in the peripheral field of view of the optical image capturing system.

An optical image capturing system of the present invention satisfies with the following condition: 0≤HVT62/HOS≤0.5, and preferably, the following condition is satisfied: 0.2≤HVT62/HOS≤0.45. Therefore, it contributes to the aberration correction in the peripheral field of view of the optical image capturing system.

A horizontal translation distance from the intersection point of the object-side surface of the sixth lens on the optical axis to the inflection point of the object-side surface of the sixth lens on the optical axis is Inf61, a horizontal translation distance from the intersection point of the image-side surface of the sixth lens on the optical axis to the inflection point of the image-side surface of the sixth lens on the optical axis is Inf62, and the following condition is satisfied: 0<Inf62/(Inf62+CT6)≤5, and preferably, the following condition is satisfied: 0.1≤Inf62/(Inf62+CT6)≤1.

An optical image capturing system satisfies with the following condition: 1 mm≤|InRS52|+|InRS61|≤5 mm, and preferably, the following condition is satisfied: 1.5 mm≤|InRS52|+InRS6|≤3.5 mm. Therefore, it controls the maximal effective diameter position between the two adjacent surfaces of the fifth and the sixth lenses, and contributes to the aberration correction in the peripheral field of view of the optical image capturing system, and effectively maintains the minimization of the system.

An optical image capturing system satisfies with the following condition: 0≤Inf62/|InRS62|≤120. Therefore, it controls the depth of the maximal effective diameter of the image-side surface of the sixth lens and the position where the inflection point shows such that the aberration in the off-axis field of view and maintenance of minimization are thereby accomplished.

One embodiment of an optical image capturing system of the present invention contributes to correcting the chromatic aberration of the optical image capturing system by a zigzag arrangement of lenses having high and low dispersion coefficients.

The preceding aspheric formula is $z=ch^2/[1+[1-(k+1)c^2h^2]^{0.5}]+A4h^4+A6h^6+A8h^8+A10h^{10}+A12h^{12}+A14h^{14}+A16h^{16}+A18h^{18}+A20h^{20}+\ldots$ (1), wherein z is the reference positional value of the surface vertex at a height h alongside the optical axis, k is a cone coefficient, c is a reciprocal of the curvature radius, and A4, A6, A8, A10, A12, A14, A16, A18 and A20 are high-level aspheric coefficients.

In an optical image capturing system of the present invention, the lens may be made of plastic or glass. When glass is served as the material, it effectively reduces production coast and volume; when glass is used as material, it controls the thermal effect and increases the space for arranging refractive power to the optical image capturing system. In addition, the object-side and the image-side surfaces of the first to the sixth lenses of the optical image capturing system may be aspheric so that more controlled variables are obtained. Besides using to reduce aberration, an optical image capturing system of the present invention is able to decrease the usage amount of lens so as to effectively reduce the total height, compared with the conventional glass lens.

Moreover, if the lens surface of an optical image capturing system of the present invention is convex, it means that the lens surface which is adjacent to the optical axis is a convex surface; to the contrary, if the lens surface is concave, the lens surface which is close to the optical axis is a concave surface.

Furthermore, an optical image capturing system of the present invention is disposed with at least one diaphragm used to reduce stray light such that the image quality is promoted.

In an optical image capturing system of the present invention, the aperture is arranged as a front or a middle one, wherein the front aperture means that the aperture is disposed between a to-be-shot object and the first lens, and the middle aperture indicates that the aperture is mounted between the first lens and the image-plane. If the aperture is a front one, it enables to produce a longer distance between the exit pupil and the image-plane of the optical image capturing system so as to accommodate more optical elements, as well as increasing the efficiency of the image sensing element receiving images; if it is a middle aperture, it helps widening the angle of the field of view of the system, enabling the optical image capturing system having advantage of wide angle lens.

In an optical image capturing system of the present invention, it is applied to the optical system which is moved to focus based on the needs, and also has characteristic of excellent aberration correction and image quality so as to be applied to widespread field.

According to the preceding embodiment, the concrete embodiment is provided as follows accompanying with drawings to make a detailed description.

The First Embodiment

Figure 1B:
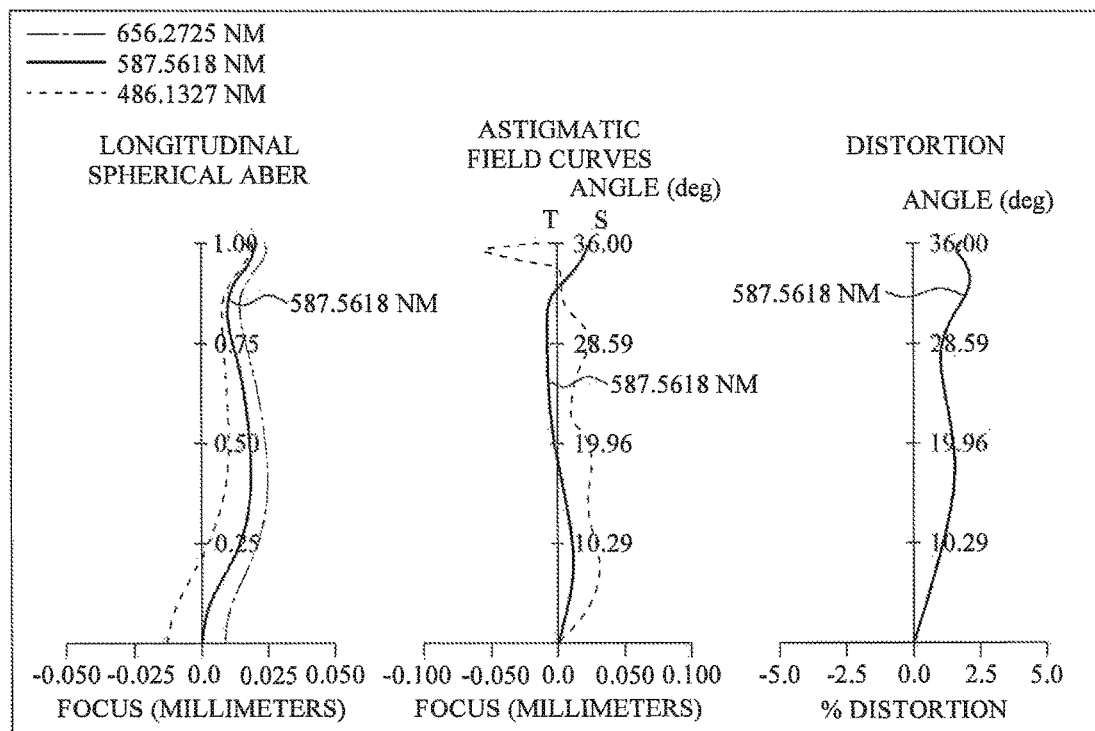
FIG. 1B is curve diagrams of longitudinal spherical aberration, astigmatic field curves and optical distortion of the first embodiment of an optical image capturing system according to the present invention from left to right.
Figure 1C:
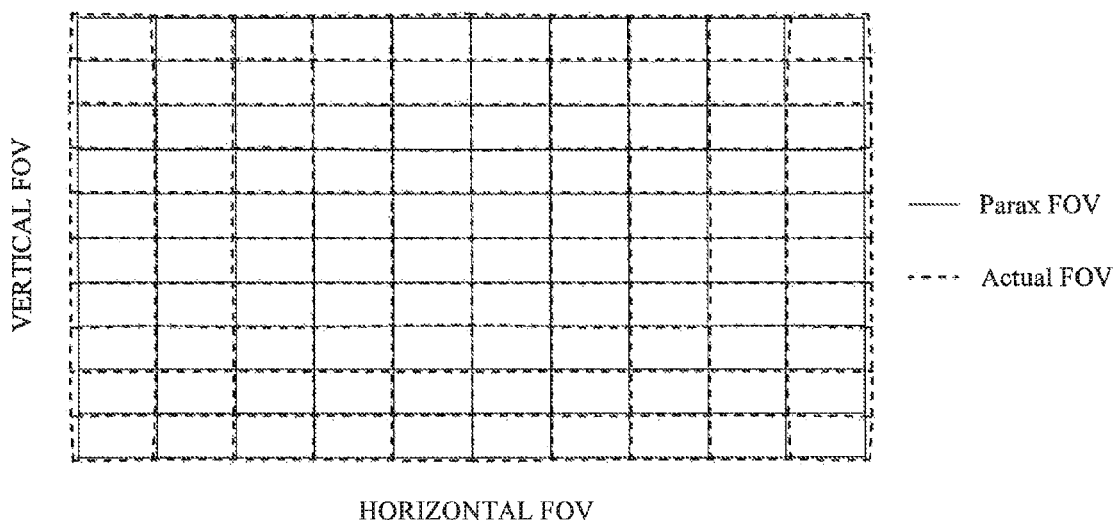
FIG. 1C is a curve diagram of TV distortion grid of the first embodiment of an optical image capturing system according to the present invention.

Please refer to FIGS. 1A and 1B which are a schematic diagram of the first embodiment of an optical image capturing system according to the present invention and curve diagrams of longitudinal spherical aberration, astigmatic field curves and optical distortion of the first embodiment of an optical image capturing system according to the present invention from left to right respectively. FIG. 1C is a curve diagram of TV distortion grid of the first embodiment of an optical image capturing system according to the present invention. It can be found through FIG. 1A that the optical image capturing system, in order from an object side to an image side comprises a first lens 110, an aperture 100, a second lens 120, a third lens 130, a fourth lens 140, a fifth lens 150, a sixth lens 160, an IR filter 170, an image-plane 180 and an image sensing element 190.

The first lens 110 has positive refractive power, and is made of plastic material; object-side surface 112 is convex and image-side surface 114 is concave and both are aspheric.

The second lens 120 has negative refractive power, and is made of plastic material; object-side surface 122 is convex and image-side surface 124 is concave and both are aspheric.

The third lens 130 has positive refractive power, and is made of plastic material; object-side surface 132 is convex and image-side surface 134 is convex and both are aspheric.

The fourth lens 140 has negative refractive power, and is made of plastic material; object-side surface 142 is concave and image-side surface 144 is convex and both are aspheric.

The fifth lens 150 has positive refractive power, and is made of plastic; object-side surface 152 is convex and has an inflection point, and image-side surface 154 is concave and both are aspheric.

The sixth lens 160 has negative refractive power, and is made of plastic material; object-side surface 162 is concave and image-side surface 164 is convex and has an inflection point, and both are aspheric.

The IR filter 180 is made of glass material, and is disposed between the sixth lens 160 and the image-plane 170 without affecting the focal length of the optical image capturing system.

In the first embodiment of the optical image capturing system, f is focal length of the optical image capturing system, an entrance pupil diameter of the optical image capturing system is HEP, a half of the maximal view angle of the optical image capturing system is HAF, and the numerical value is stated as follows: f=5.2905 mm; f/HEP=1.4; and HAF=36 degree and tan(HAF)=0.7265.

In the first embodiment of the optical image capturing system, focal length of the first lens 110 is f1, focal length of the sixth lens 160 is f6, and the following conditions are satisfied: f1=7.984 mm; |f/f1|=0.6626; f6=−6.1818 mm; |f1|>f6; and |f1/f6|=1.2915.

In the first embodiment of the optical image capturing system, focal lengths of the second 120 to the fifth 150 lenses are respectively f2, f3, f4 and f5, and the following conditions are satisfied: |f2|+|f3|+|f4|+|f5|=27.9195 mm; |f1|+|f6|=14.1658 mm and |f2|+|f3|+|f4|+|f5|>|f1|+|f6|.

A ratio f/fp between focal length f of the optical image capturing system and a focal length fp of each lens having positive refractive power is PPR, a ratio f/fn between focal length f of the optical image capturing system and a focal length fn of each lens having negative refractive power is NPR; in the first embodiment of the optical image capturing system, a sum of the PPR of all the lenses having positive refractive power is ΣPPR=f/f1+f/f3+f/f5=2.7814, a sum of the NPR of all the lenses having negative refractive power is ΣNPR=f/f2+f/f4+f/f6=−2.0611, ΣPPR/|ΣNPR|=1.3494.

In the first embodiment of the optical image capturing system, a distance from the object-side surface 112 of the first lens to the image-side surface 164 of the sixth lens is InTL, a distance from the object-side surface 112 of the first lens to the image-plane 180 is HOS, a distance from the aperture 100 to the image-plane 180 is InS, a half of a diagonal line of n an effective detection field of the image sensing element 190 effectively is HOI, a distance from the image-side surface 164 of the sixth lens to the image-plane 180 is InB, and the following conditions are satisfied: InTL+InB=HOS; HOS=8.9645 mm; HOI=3.913 mm; HOS/HOI=2.2910; HOS/f=1.6945; InS=8.3101 mm; and InS/HOS=0.927.

In the first embodiment of the optical image capturing system, on the optical axis, a total thickness of all the lenses having refractive power is ΣTP, and the following condition is satisfied: ΣTP=5.2801 mm; and ΣTP/InTL=0.6445. Therefore, it can take care of the contrast ratio while the system is imaging and the defeat-free rate when manufacturing the lenses to provide an adequate back focal length for accommodating other elements.

In the first embodiment of the optical image capturing system, curvature radius of the object-side surface 112 of the first lens is R1, curvature radius of the image-side surface 114 of the first lens is R2, and the following condition is satisfied: |R1/R2|=0.598. Therefore, the first lens is with adequate positive refractive power to avoid the aberration increasing overly.

In the first embodiment of the optical image capturing system, curvature radius of the object-side surface 162 of the sixth lens is R11, curvature radius of the image-side surface 164 of the sixth lens is R12, and the following condition is satisfied: (R11−R12)/(R11+R12)=−0.7976. Therefore, it contributes to correcting the aberration caused by the optical image capturing system.

In the first embodiment of the optical image capturing system, focal lengths of the first 110, the third 130 and the fifth 150 lenses are respectively f1, f3 and f5, and a sum of the focal lengths of all the lenses having positive refractive power in ΣPP, and the following conditions are satisfied: ΣPP=f1+f3+f5=18.3455 mm; and f1/(f1+f3+f5)=0.4352. Therefore, it is able to adequately distribute the positive refractive power of the first lens 110 to suppress the obvious aberration occurring too early in the process of incident light traveling.

In the first embodiment of the optical image capturing system, focal lengths of the second 120, the fourth 140 and the sixth 160 lenses are respectively f2, f4 and f6, and a sum of the focal lengths of all the lenses having negative refractive power in ΣNP, and the following conditions are satisfied: ΣNP=f2+f4+f6=−23.7398 mm; and f6/(f2+f4+f6)= 0.3724. Therefore, it is able to adequately distribute the negative refractive power of the sixth lens to others concave lens elements, so as to suppress the obvious aberration occurring too early in the process of incident light traveling.

In the first embodiment of the optical image capturing system, an distance from the first 110 and the second 120 lenses on the optical axis is IN12, and the following conditions are satisfied: IN12=0.8266 mm; IN12/f=0.1562. Therefore, it contributes to the improvement in the chromatic aberration of the lens to promote the capability.

In the first embodiment of the optical image capturing system, thicknesses of the first 110 and the second 120 lenses on the optical axis are respectively TP1 and TP2, and the following conditions are satisfied: TP1=0.6065 mm; TP2=0.4574 mm; and (TP1+IN12)/TP2=3.1331. Therefore, it contributes to controlling the sensitivity of manufacturing the optical image capturing system and increase the performance.

In the first embodiment of the optical image capturing system, thicknesses of the fifth 150 and the sixth 160 lenses on the optical axis are respectively TP5 and TP6, an distance of the preceding two lenses on the optical axis is IN56, and the following conditions are satisfied: TP5=1.0952 mm; TP6=0.4789 mm; and (TP6+IN56)/TP5=1.3378. Therefore, it contributes to controlling the sensitivity of manufacturing the optical image capturing system and reduces the total height of the system.

In the first embodiment of the optical image capturing system, thickness of the third 130, the fourth 140 and the fifth 150 lenses on the optical axis are respectively TP3, TP4 and TP5; an distance between the third 130 and the fourth 140 lenses on the optical axis is IN34, an distance between the fourth 140 and the fifth 150 lenses on the optical axis is IN4, and the following conditions are satisfied: TP3=2.0138 mm; TP4=0.6283 mm; TP5=1.0952 mm; and (TP3+TP4+TP5)/ΣTP=0.5843. Therefore, it contributes to fine-tuning the aberration caused in the process of incident light traveling and reduces the total height of the system.

In the first embodiment of the optical image capturing system, a horizontal translation distance from an intersection point of the object-side surface 152 of the fifth lens on the optical axis to the maximal effective diameter position of the object-side surface 152 of the fifth lens on the optical axis is InRS51, a horizontal translation distance from an intersection point of the image-side surface 154 of the fifth lens on the optical axis to the maximal effective diameter position of the image-side surface 154 of the fifth lens on the optical axis is InRS52, a thickness of the fifth lens 150 on the optical axis is TP5, and the following conditions are satisfied: InRS51=0.3945 mm; InRS52=−0.5015 mm; and |InRS52|/TP5=0.4579. Therefore, it contributes to the manufacture and formation of the lenses, and is able to effectively maintain miniaturization of the system.

In the first embodiment of the optical image capturing system, a vertical distance from a critical point of the object-side surface 152 of the fifth lens and the optical axis is HVT51, a vertical distance from a critical point of the image-side surface 154 of the fifth lens and the optical axis is HVT52, and the following conditions are satisfied: HVT51=2.3446 mm; HVT52=1.2401 mm.

In the first embodiment of the optical image capturing system, a horizontal translation distance from an intersection point of the object-side surface 152 of the fifth lens on the optical axis to an inflection point of the object-side surface 152 of the fifth lens on the optical axis is Inf51, a horizontal translation distance from an intersection point of the image-side surface 154 of the fifth lens on the optical axis to an inflection point of the image-side surface 154 of the fifth lens on the optical axis is Inf52, and the following conditions are satisfied: Inf51=0.4427 mm; Inf52=0.0638 mm; HVT52/(Inf52+CT5)=1.070; and tan$^{-1}$(HVT52/(Inf52+CT5))= 46.9368 degree.

In the first embodiment of the optical image capturing system, a horizontal translation distance from an intersection point of the object-side surface 162 of the sixth lens on the optical axis to an inflection point of the object-side surface 162 of the sixth lens on the optical axis is Inf61, a horizontal translation distance from an intersection point of the image-side surface 164 of the sixth lens on the optical axis to an inflection point of the image-side surface 164 of the sixth lens on the optical axis is Inf62, a thickness of the sixth lens 160 on the optical axis is TP6, and the following conditions are satisfied: InRS61=−1.4393 mm; InRS62=−0.1489 mm; and |InRS62|/TP6=0.3109. Therefore, it contributes to the manufacture and formation of the lenses, and is able to effectively maintain miniaturization of the system.

In the first embodiment of the optical image capturing system, a vertical distance between the critical point of the object-side surface 162 of the sixth lens and the optical axis is HVT61, a vertical distance between the critical point of the image-side surface 164 of the sixth lens and the optical axis is HVT62, and the following conditions are satisfied: HVT61=0 mm; HVT62=3.1461 mm; and HVT61/HVT62=0. Therefore, it effectively corrects the aberration in the off-axis field of view.

In the first embodiment of the optical image capturing system, the following condition is satisfied: HVT62/HOI=0.8040. Therefore, it contributes to the aberration correction in the peripheral field of view of the optical image capturing system.

In the first embodiment of the optical image capturing system, the following condition is satisfied: HVT62/HOS=0.3510. Therefore, it contributes to the aberration correction in the peripheral field of view of the optical image capturing system.

In the first embodiment of the optical image capturing system, a horizontal translation distance from an intersection point of the object-side surface 162 of the sixth lens on the optical axis to an inflection point of the object-side surface 162 of the sixth lens on the optical axis is Inf61, a horizontal translation distance from an intersection point of the image-side surface 164 of the sixth lens on the optical axis to an inflection point of the image-side surface 164 of the sixth lens on the optical axis is Inf62, and the following conditions are satisfied: Inf61=0 mm; Inf62=0.1954 mm; HVT62/(Inf62+CT6)=4.6657; and tan$^{-1}$(HVT62/(Inf62+CT6))= 77.9028 degree.

In the first embodiment of the optical image capturing system, the following condition is satisfied: |InRS52|+|InRS61|=1.9408 mm. Therefore, it controls a distance of the maximal effective diameter position of the two surfaces that are adjacent to the fifth 150 and the sixth 160 lenses such that contributes to the aberration correction in the peripheral field of view of the optical image capturing system and effectively maintains the miniaturization of the system.

In the first embodiment of the optical image capturing system, the following condition is satisfied: Inf62/|InRS62|=1.3123. Therefore, it controls the depth of the maximal effective diameter of the image-side surface 164 of the sixth lens and the occurring position of the inflection point thereof which contributes to correcting the aberration in the off-axis field of view and effectively maintains the miniaturization of the system.

In the first embodiment of the optical image capturing system, the second 120, the fourth 140 and the sixth 160 lenses have negative refractive power. The Abbe number of the second lens is NA2, the Abbe number of the fourth lens is NA4, the Abbe number of the sixth lens is NA6, and the following condition is satisfied: 1≤NA6/NA2. Therefore, it contributes to correcting the chromatic aberration of the optical image capturing system.

In the first embodiment of the optical image capturing system, when the optical image capturing system is imaging, TV distortion is TDT, and optical distortion is ODT, and the following conditions are satisfied: |TDT|=0.96%; |ODT|=1.9485%.

Please refer to the following table 1 along with table 2.

TABLE 1

The lens parameter of the first embodiment
Table 1. The first embodiment
f(focal length) = 5.2905 mm; f/HEP = 1.4; HAF(half FOV) = 32 deg; tan(HAF) = 0.7265

| Surface | | Curvature radius | Thickness | Material | Refractive Index | Abbe # | Focal length |
|---|---|---|---|---|---|---|---|
| 0 | To-be-shot object | Plano | INFINITY | | | | |
| 1 | First lens | 4.2552 | 0.6065 | Plastic | 1.565 | 54.5 | 7.984 |
| 2 | | 71.1925 | 0.0480 | | | | |
| 3 | Aperture | Plano | 0.7787 | | | | |
| 4 | Second lens | 6.0791 | 0.4574 | Plastic | 1.65 | 21.4 | −8.8412 |
| 5 | | 2.8666 | 0.5561 | | | | |
| 6 | Third lens | 10.2020 | 2.0138 | Plastic | 1.565 | 58 | 4.1972 |
| 7 | | −2.8694 | 0.4940 | | | | |
| 8 | Fourth lens | −1.0612 | 0.6283 | Plastic | 1.565 | 54.5 | −8.7168 |
| 9 | | −1.6418 | 0.0500 | | | | |
| 10 | Fifth lens | 2.3012 | 1.0952 | Plastic | 1.565 | 58 | 6.1643 |
| 11 | | 5.6173 | 0.9863 | | | | |
| 12 | Sixth lens | −3.1756 | 0.4789 | Plastic | 1.583 | 30.2 | −6.1818 |
| 13 | | −28.2003 | 0.3000 | | | | |
| 14 | IR filter | Plano | 0.2000 | | 1.517 | 64.2 | |

TABLE 1-continued

The lens parameter of the first embodiment
Table 1. The first embodiment
f(focal length) = 5.2905 mm; f/HEP = 1.4; HAF(half FOV) = 32 deg; tan(HAF) = 0.7265

| Surface | Curvature radius | Thickness | Material | Refractive Index | Abbe # | Focal length |
|---|---|---|---|---|---|---|
| 15 |  | Plano | 0.2563 |  |  |  |
| 16 | Image-plane | Plano | 0.0151 |  |  |  |

Reference wavelength (d-line) is 587.5 nm

TABLE 2

The aspheric coefficient of the first embodiment
Table 2. The aspheric coefficient

| | Surface | | | | | |
|---|---|---|---|---|---|---|
| | 1 | 2 | 4 | 5 | 6 | 7 |
| k = | −1.92977E−03 | 6.76819E−04 | −1.48087E−02 | −9.42908E−03 | −2.91344E−03 | −1.25824E−02 |
| A4 = | 1.05934E−04 | 1.07039E−03 | −2.20151E−03 | 1.28503E−03 | −7.60139E−04 | 2.23748E−03 |
| A6 = | −6.25283E−05 | −2.35638E−04 | 9.92240E−04 | −2.58821E−04 | 1.40480E−04 | 1.22574E−04 |
| A8 = | −1.16210E−06 | 3.59820E−05 | −2.06067E−04 | 4.99180E−06 | −5.56820E−05 | −3.42043E−05 |
| A10 = | | | | | | |
| A12 = | | | | | | |
| A14 = | | | | | | |

| | Surface | | | | | |
|---|---|---|---|---|---|---|
| | 8 | 9 | 10 | 11 | 12 | 13 |
| k = | −2.56929E−03 | −6.96965E−03 | −6.41195E−03 | −2.01907E−02 | −1.86873E−03 | 9.91901E−03 |
| A4 = | 4.97268E−04 | −1.21600E−04 | −5.36474E−04 | −4.74909E−04 | 1.28019E−03 | −1.32067E−03 |
| A6 = | 2.49337E−04 | 1.61724E−05 | −4.02556E−05 | 3.45850E−04 | −3.39587E−05 | −6.75471E−04 |
| A8 = | −3.33577E−05 | −3.93832E−06 | 1.54534E−05 | −3.21501E−05 | 6.55577E−06 | 8.73598E−05 |
| A10 = | | | −2.21906E−07 | 2.37380E−06 | −9.16956E−07 | −4.93107E−06 |
| A12 = | | | −3.86881E−08 | −1.04159E−07 | 2.98564E−08 | 1.02536E−07 |
| A14 = | | | | | | |

Table 1 is the detailed structural parameters of first embodiment, wherein the units of the curvature radius, thickness, distance and focal length are millimeters (mm), and surfaces 0-16 indicate the surfaces from the object-side to the image-side orderly. Table 2 is the aspheric parameters of the first embodiment, wherein, k is the cone coefficient of the aspheric curve equation, A1-A14 indicate aspheric parameters of each of 1-14 orders. In addition, the tables of the following embodiments correspond with the schematic and aberration curve diagrams of each embodiment, and definitions of the data in the tables are all the same as that in tables 1 and 2 of the first embodiment. The unnecessary details are therefore no longer given herein.

The Second Embodiment

Figure 2A:
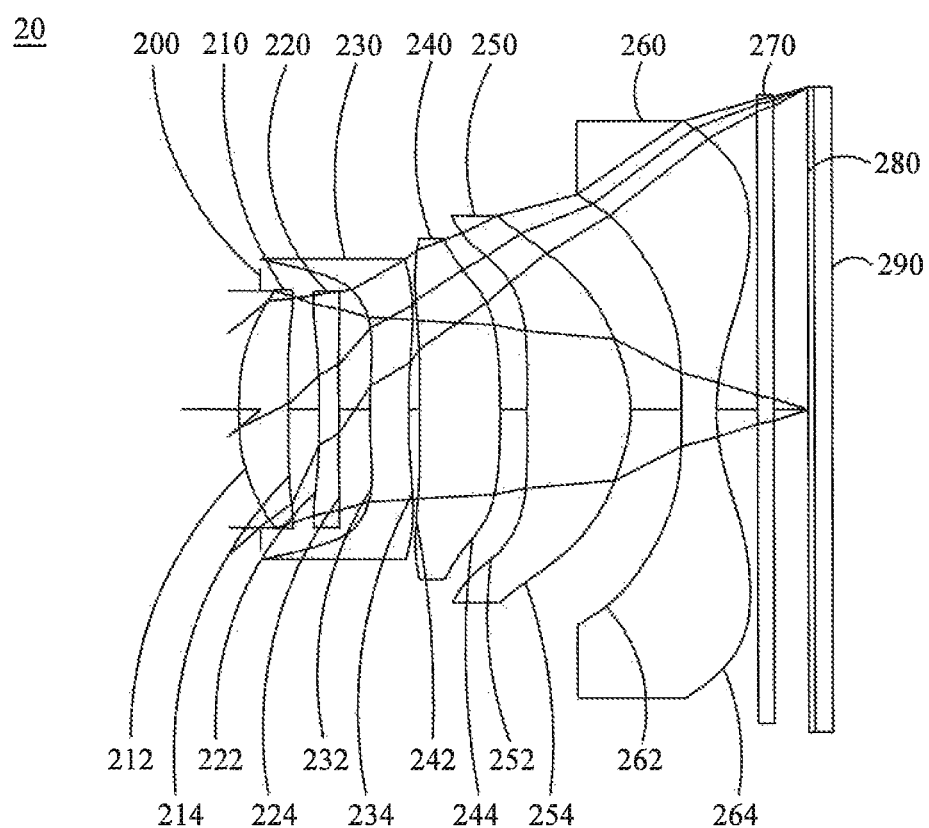
FIG. 2A is a schematic diagram of the second embodiment of an optical image capturing system according to the present invention.
Figure 2B:
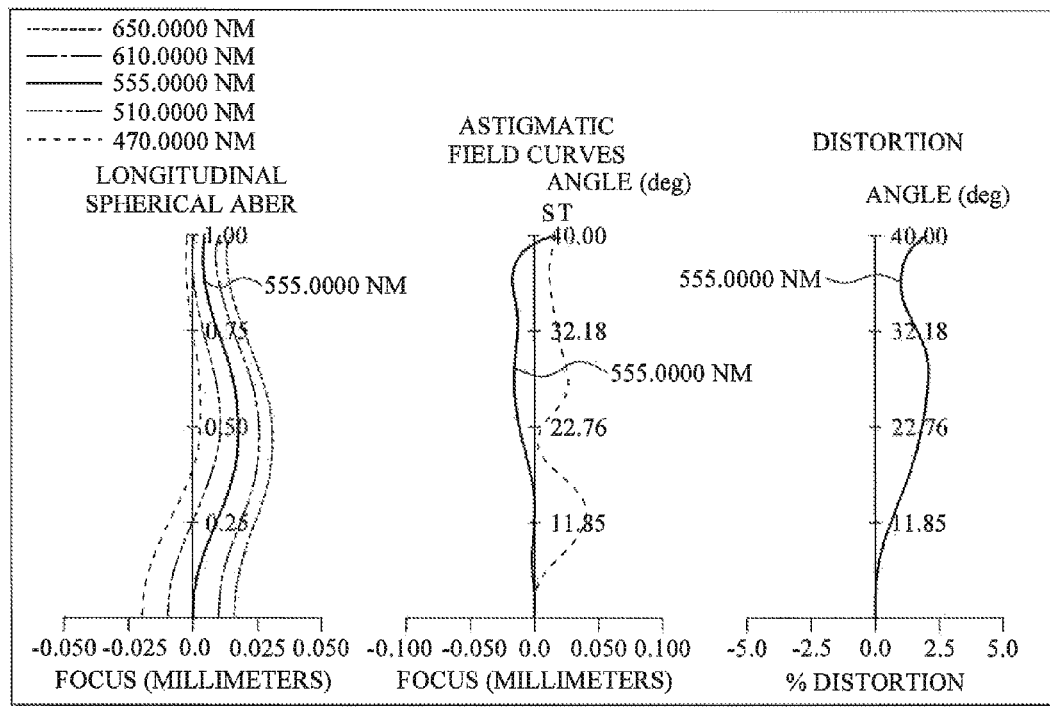
FIG. 2B is curve diagrams of longitudinal spherical aberration, astigmatic field curves and optical distortion of the second embodiment of an optical image capturing system according to the present invention from left to right.
Figure 2C:
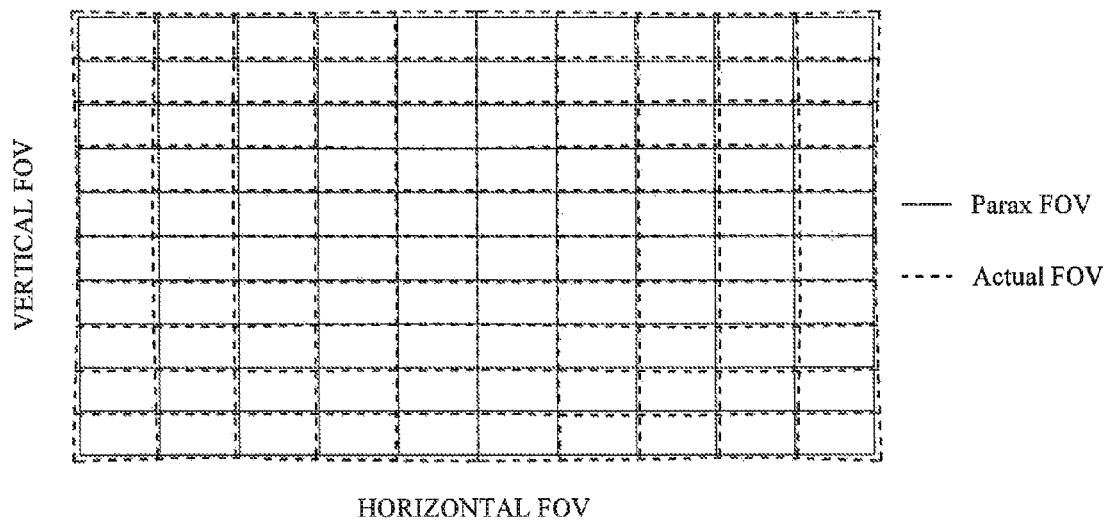
FIG. 2C is a curve diagram of TV distortion grid of the second embodiment of an optical image capturing system according to the present invention.

Please refer to FIGS. 2A and 2B which are a schematic diagram of the second embodiment of an optical image capturing system according to the present invention and curve diagrams of longitudinal spherical aberration, astigmatic field curves and optical distortion of the second embodiment of an optical image capturing system according to the present invention from left to right, respectively. FIG. 2C is a curve diagram of TV distortion grid of the second embodiment of an optical image capturing system according to the present invention. It can be found through FIG. 2A that the optical image capturing system, in order from an object side to an image side comprises an aperture 200, a first lens 210, a second lens 220, a third lens 230, a fourth lens 240, a fifth lens 250, a sixth lens 260, an IR filter 270, an image-plane 280 and an image sensing element 290.

The first lens 210 has positive refractive power, and is made of plastic material; object-side surface 212 is convex and image-side surface 214 is concave and both are aspheric The second lens 220 has negative refractive power, and is made of plastic material; object-side surface 222 is concave and image-side surface 224 is convex and both are aspheric.

The third lens 230 has positive refractive power, and is made of plastic material; object-side surface 232 is convex and image-side surface 234 is concave and both are aspheric.

The fourth lens 240 has positive refractive power, and is made of plastic material; object-side surface 242 is concave and image-side surface 244 is convex and both are aspheric.

The fifth lens 250 has positive refractive power, and is made of plastic material; object-side surface 252 is convex and image-side surface 254 is convex and both are aspheric.

The sixth lens 260 has negative refractive power, and is made of plastic material; object-side surface 262 is concave and image-side surface 264 is concave; both the object-side 262 and the image-side 264 surfaces have inflection point and both are aspheric.

The IR filter 270 is made of glass, and is disposed between the sixth lens 260 and the image-plane 280 without affecting the focal length of the optical image capturing system.

In the second embodiment of the optical image capturing system, focal lengths of the second 220 to the fifth 250 lenses are respectively f2, f3, f4 and f5, and the following conditions are satisfied: |f2|+|f3|+|f4|+|f5|=119.92625 mm; |f1|+|f6|=1.985256819 mm; and |f2|+|f3|+|f4|+|f5|>|f1|+|f6|.

In the second embodiment of the optical image capturing system, a thickness of the fifth lens 250 on the optical axis is TP5, a thickness of the sixth lens 260 on the optical axis is TP6, and the following conditions are satisfied: TP5=1.25217 mm; and TP6=0.422413 mm.

In the second embodiment of the optical image capturing system, the first 210, the third 230, the fifth 250 and the fourth 240 are all positive lenses; the focal lengths are respectively f1, f3, f5 and f4, a sum of focal lengths of all the lenses having positive refractive power is ΣPP, and the following conditions are satisfied: ΣPP=f1+f3+f4+f5=6.5053 mm; and f1/(f1+f3+f4+f5)=0.6837. Therefore, it is able to adequately distribute the positive refractive power of the first lens 210 to the other positive lenses to suppress the obvious aberration occurring too early in the process of incident light traveling.

In the second embodiment of the optical image capturing system, focal lengths of the second 220 and the sixth 260 lenses are respectively f2 and f6, a sum of focal lengths of all the lenses having negative refractive power is ΣNP, and the following conditions are satisfied: ΣNP=f2+f6= −12.09595 mm; and f6/(f2+f3+f5+f6)=0.0931. Therefore, it contributes to distributing the negative refractive power of the sixth lens 260 to the other negative lenses.

In the second embodiment of the optical image capturing system, a vertical distance between a critical point of the object-side surface 252 of the fifth lens and the optical axis is HVT51, a vertical distance between the critical point of the image-side surface 254 of the fifth lens and the optical axis is HVT52, and the following conditions are satisfied: HVT51=0.385873 mm; HVT52=0 mm. A horizontal translation distance from an intersection point of the object-side surface 252 of the fifth lens on the optical axis to an inflection point of the object-side surface 252 of the fifth lens on the optical axis is Inf51, a horizontal translation distance from an intersection point of the image-side surface 254 of the fifth lens on the optical axis to an inflection point of the image-side surface 254 of the fifth lens on the optical axis is Inf52, and the following conditions are satisfied: Inf51=0.000743933 mm; Inf52=0 mm.

Please refer to the following table 3 along with table 4.

TABLE 3

The lens parameter of the second embodiment
Table 3. The second embodiment
f(focal length) = 4.56647 mm; f/HEP = 1.6; HAF(half FOV) = 40 deg; tan(HAF)= 0.8390

| Surface | | Curvature radius | Thickness | Material | Refractive Index | Abbe # | Focal length |
|---|---|---|---|---|---|---|---|
| 0 | To-be-shot object | Plano | INFINITY | | | | |
| 1 | Aperture | Plano | −0.27884 | | | | |
| 2 | First lens | 2.69808 | 0.615667 | Plastic | 1.565 | 58 | 5.10346 |
| 3 | | 36.82125 | 0.375222 | | | | |
| 4 | Second lens | −5.59997 | 0.23 | Plastic | 1.607 | 26.6 | −9.52527 |
| 5 | | −149.788 | 0.367925 | | | | |
| 6 | Third lens | 5.75247 | 0.463542 | Plastic | 1.65 | 21.4 | 68.4675 |
| 7 | | 6.38774 | 0.139014 | | | | |
| 8 | Fourth lens | −23.33 | 0.976288 | Plastic | 1.565 | 58 | 39.0266 |
| 9 | | −11.5262 | 0.313688 | | | | |
| 10 | Fifth lens | 49.71648 | 1.252173 | Plastic | 1.565 | 58 | 2.90688 |
| 11 | | −1.68851 | 0.624505 | | | | |
| 12 | Sixth lens | −9.82283 | 0.422413 | Plastic | 1.583 | 33.02 | −2.57068 |
| 13 | | 1.80826 | 0.5 | | | | |
| 14 | IR filter | Plano | 0.2 | | 1.517 | 64.2 | |
| 15 | | Plano | 0.391053 | | | | |
| 16 | Image-plane | Plano | 0.010361 | | | | |

Reference wavelength (d-line) is 555 nm

TABLE 4

The aspheric coefficient of the second embodiment
Table 4. The aspheric coefficient

| | Surface | | | | | |
|---|---|---|---|---|---|---|
| | 2 | 3 | 4 | 5 | 6 | 7 |
| k = | 0.268 | −18.484172 | −20.896604 | −50 | −0.253417 | −6.878887 |
| A4 = | 1.31658E−03 | 5.50213E−03 | 2.82650E−02 | 2.22572E−02 | −5.67541E−02 | −1.78272E−02 |
| A6 = | 1.65430E−03 | 1.03065E−03 | −7.99521E−03 | −7.84390E−03 | −5.03286E−03 | −5.14051E−03 |
| A8 = | −4.40661E−04 | −7.00480E−04 | −5.26294E−04 | −2.15082E−04 | −2.68100E−03 | −3.91816E−05 |
| A10 = | 2.85240E−04 | 2.56566E−04 | 7.33741E−04 | 1.11202E−04 | −1.30029E−03 | 3.01471E−04 |
| A12 = | | | | | | |
| A14 = | | | | | | |

| | Surface | | | | |
|---|---|---|---|---|---|
| | 8 | 9 | 10 | 11 | 12 | 13 |
| k = | 50 | 21.693663 | 17.782875 | −2.821013 | 3.538467 | −5.692642 |
| A4 = | 1.39769E−03 | −2.69463E−02 | −3.45446E−02 | −6.86690E−03 | −3.58860E−02 | −2.55765E−02 |
| A6 = | −1.20506E−03 | −4.86246E−03 | 4.25712E−03 | −3.11991E−03 | 4.63036E−03 | 4.67055E−03 |

TABLE 4-continued

The aspheric coefficient of the second embodiment
Table 4. The aspheric coefficient

| A8 = | 3.29943E−04 | −1.36871E−04 | −4.34139E−03 | −9.80492E−05 | −5.35599E−05 | −4.78629E−04 |
|---|---|---|---|---|---|---|
| A10 = | 5.15154E−05 | 3.36947E−04 | −1.39398E−04 | −2.16094E−05 | −5.72993E−05 | 1.24673E−05 |
| A12 = | | | 3.64651E−04 | 1.52979E−06 | 3.89295E−06 | 7.33719E−07 |
| A14 = | | | −3.97875E−05 | 2.07886E−06 | −1.72263E−07 | −3.84374E−08 |

In the second embodiment, the aspheric curve equation is displayed the same as the first embodiment. In addition, definitions of the parameters listed in the following table are the same as that of the first embodiment, and the unnecessary details are therefore no longer given herein.

According to tables 3 and 4 the following conditional parameters are found.

| The second embodiment | | | |
|---|---|---|---|
| \|f/f1\| | 0.8948 | InRS51 | −0.9971 |
| f1/ΣPP | 0.0442 | InRS52 | −1.6120 |
| f6/ΣNP | 0.2125 | InRS61 | −1.2700 |
| IN12/f | 0.0822 | InRS62 | −0.4260 |
| HOS/f | 1.5070 | Inf61 | 0 |
| ΣPPR | 2.6494 | HVT61 | 0 |
| \|ΣNPR\| | 2.2558 | Inf62 | 0.4092 |
| ΣPPR/\|ΣNPR\| | 1.1745 | HVT62 | 2.2402 |
| (R11 − R12)/(R11 + R12) | 1.4512 | \|InRS52\|/TP5 | 1.2874 |
| HOS | 6.8819 | \|InRS52\| + \|InRS61\| | 2.8820 |
| HOS/HOI | 1.7589 | \|InRS62\|/TP6 | 1.0086 |
| InS/HOS | 0.9595 | Inf62/\|InRS62\| | 0.9604 |
| InTL/HOS | 0.8400 | HVT62/HOI | 0.5726 |
| ΣTP/InTL | 0.6851 | HVT62/HOS | 0.3255 |
| (TP1 + IN12)/TP2 | 4.3082 | HVT62/(Inf62 + CT6) | 2.6940 |
| (TP6 + IN56)/TP5 | 0.8361 | \|TDT\| | 1.0992% |
| (TP2 + TP3 + TP4)/ΣTP | 0.6798 | \|ODT\| | 2.0945% |

The Third Embodiment

Figure 3A:
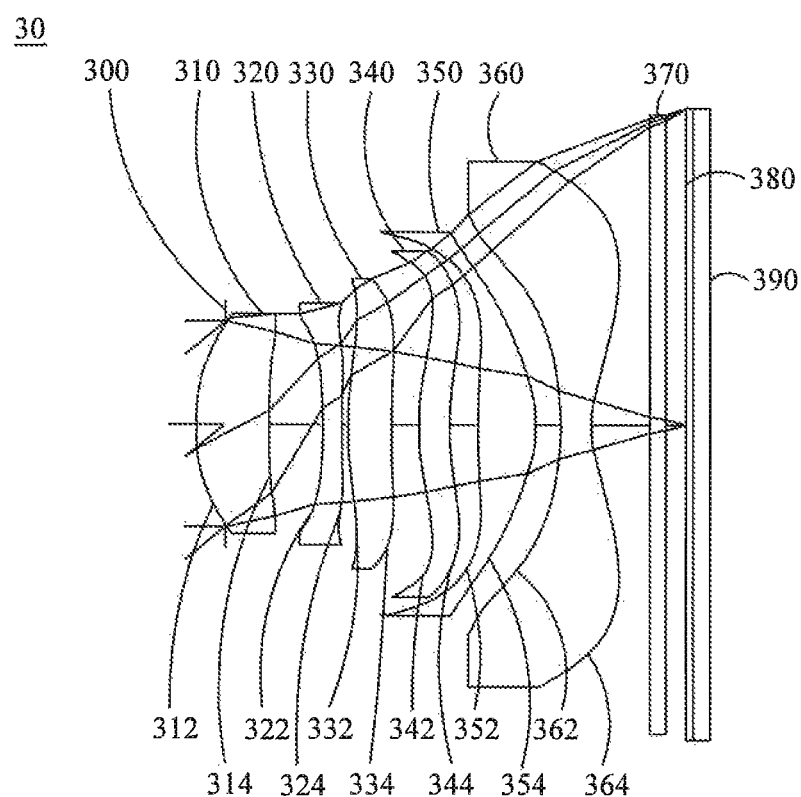
FIG. 3A is a schematic diagram of the third embodiment of an optical image capturing system according to the present invention.
Figure 3B:
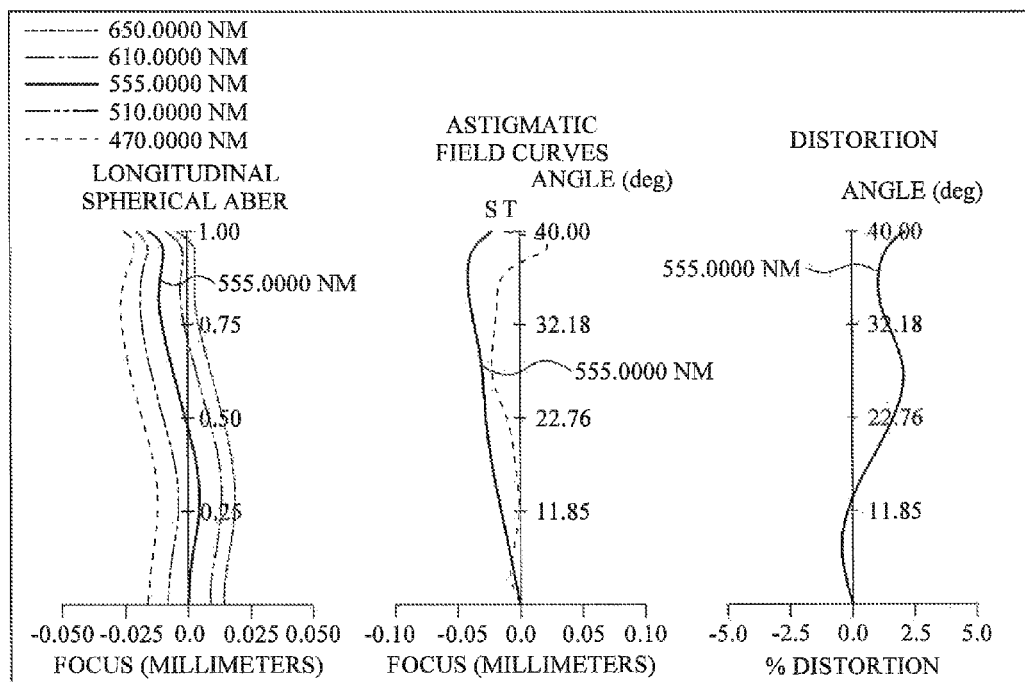
FIG. 3B is curve diagrams of longitudinal spherical aberration, astigmatic field curves and optical distortion of the third embodiment of an optical image capturing system according to the present invention from left to right.
Figure 3C:
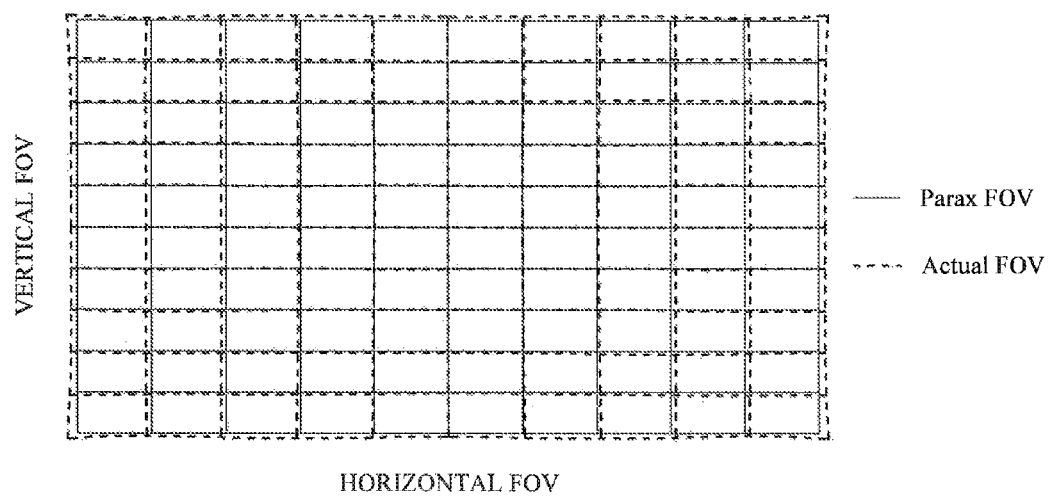
FIG. 3C is a curve diagram of TV distortion grid of the third embodiment of an optical image capturing system according to the present invention.

Please refer to FIGS. 3A and 3B which are a schematic diagram of the third embodiment of an optical image capturing system according to the present invention and curve diagrams of longitudinal spherical aberration, astigmatic field curves and optical distortion of the third embodiment of an optical image capturing system according to the present invention from left to right, respectively. FIG. 3C is a curve diagram of TV distortion grid of the third embodiment of an optical image capturing system according to the present invention. It can be found through FIG. 3A that the optical image capturing system, in order from an object side to an image side comprises an aperture 300, a first lens 310, a second lens 320, a third lens 330, a fourth lens 340, a fifth lens 350, a sixth lens 360, an IR filter 370, an image-plane 380 and an image sensing element 390.

The first lens 310 has positive refractive power, and is made of plastic material; object-side surface 312 is convex and image-side surface 314 is concave and both are aspheric The second lens 320 has negative refractive power, and is made of plastic material; object-side surface 322 is concave and image-side surface 324 is concave and both are aspheric.

The third lens 330 has positive refractive power, and is made of plastic material; object-side surface 332 is convex and image-side surface 334 is concave and both are aspheric.

The fourth lens 340 has positive refractive power, and is made of plastic material; object-side surface 342 is convex and image-side surface 344 is concave and both are aspheric.

The fifth lens 350 has positive refractive power, and is made of plastic material; object-side surface 352 is convex and image-side surface 354 is convex and both are aspheric.

The sixth lens 360 has negative refractive power, and is made of plastic material; object-side surface 362 is concave and image-side surface 364 is concave and both are aspheric, and the image-side 364 surface has inflection points.

The IR filter 370 is made of glass material, and is disposed between the sixth lens 360 and the image-plane 380 without affecting the focal length of the optical image capturing system.

In the third embodiment of the optical image capturing system, focal lengths of the second 320 to the fifth 350 lenses are respectively f2, f3, f4 and f5, and the following conditions are satisfied: |f2|+|f3|+|f4|+|f5|=123.30892 mm; |f1|+|f6|=7.76573 mm and |f2|+|f3|+|f4|+|f5|>|f1|+|f6|.

In the third embodiment of the optical image capturing system, a thickness of the fifth lens 350 on the optical axis is TP5, a thickness of the sixth lens 360 on the optical axis is TP6, and the following conditions are satisfied: TP5=0.715764 mm; and TP6=0.381336 mm.

In the third embodiment of the optical image capturing system, the first 310, the third 330, the fourth 340 and the fifth 350 are all positive lenses; the focal lengths are respectively f1, f3, f4 and f5, a sum of focal lengths of all the lenses having positive refractive power is ΣPP, and the following conditions are satisfied: ΣPP=f1+f3+f4+f5=121.0779 mm; and f1/(f1+f3+f4+f5)=0.0481. Therefore, it is able to adequately distribute the positive refractive power of the first lens 310 to the other positive lenses to suppress the obvious aberration occurring too early in the process of incident light traveling.

In the third embodiment of the optical image capturing system, focal lengths of the second 320 and the sixth 360 lenses are respectively f2 and f6, a sum of focal lengths of all the lenses having negative refractive power is ΣNP, and the following conditions are satisfied: ΣNP=f2+f6=−9.9968 mm; and f6/(f2+f6)=0.1948. Therefore, it contributes to distributing the negative refractive power of the sixth lens 360 to the other negative lenses.

In the third embodiment of the optical image capturing system, a vertical distance between a critical point of the object-side surface 352 of the fifth lens and the optical axis is HVT51, a vertical distance between the critical point of the image-side surface 354 of the fifth lens and the optical axis is HVT52, and the following conditions are satisfied: HVT51=1.0278 mm; HVT52=0 mm. A horizontal translation distance from an intersection point of the object-side surface 352 of the fifth lens on the optical axis to an inflection point of the object-side surface 352 of the fifth lens on the optical axis is Inf51, a horizontal translation distance from an intersection point of the image-side surface 354 of the fifth lens on the optical axis to an inflection point of the image-side surface 354 of the fifth lens on the optical axis is Inf52, and the following conditions are satisfied: Inf51=0.0418 mm; Inf52=0 mm.

Please refer to the following table 5 along with table 6.

TABLE 5

The lens parameter of the third embodiment
Table 5. The third embodiment
f(focal length) = 4.579 mm; f/HEP = 1.8; HAF(half FOV) = 40 deg; tan(HAF) = 0.8390

| Surface | | Curvature radius | Thickness | Material | Refractive Index | Abbe # | Focal length |
|---|---|---|---|---|---|---|---|
| 0 | To-be-shot object | Plano | INFINITY | | | | |
| 1 | Aperture | Plano | −0.36005 | | | | |
| 2 | First lens | 2.30913 | 0.901951 | Plastic | 1.565 | 58 | 5.81848 |
| 3 | | 6.61404 | 0.65117 | | | | |
| 4 | Second lens | −7.00422 | 0.23 | Plastic | 1.65 | 21.4 | −8.0495 |
| 5 | | 21.66077 | 0.079932 | | | | |
| 6 | Third lens | 4.24051 | 0.530353 | Plastic | 1.565 | 58 | 12.9875 |
| 7 | | 9.55033 | 0.338364 | | | | |
| 8 | Fourth lens | 3.34787 | 0.36476 | Plastic | 1.583 | 30.2 | 100 |
| 9 | | 3.40754 | 0.344882 | | | | |
| 10 | Fifth lens | 6.58791 | 0.715764 | Plastic | 1.53 | 55.8 | 2.27192 |
| 11 | | −1.42353 | 0.308903 | | | | |
| 12 | Sixth lens | −4.11451 | 0.381336 | Plastic | 1.535 | 55.7 | −1.94725 |
| 13 | | 1.44647 | 0.7 | | | | |
| 14 | IR filter | Plano | 0.2 | | 1.517 | 64.2 | |
| 15 | | Plano | 0.263746 | | | | |
| 16 | Image-plane | Plano | −0.01116 | | | | |

Reference wavelength (d-line) is 555 nm

TABLE 6

The aspheric coefficient of the third embodiment
Table 6. The aspheric coefficient

| | Surface | | | | | |
|---|---|---|---|---|---|---|
| | 2 | 3 | 4 | 5 | 6 | 7 |
| k = | −6.67248 | 3.664138 | 14.828409 | −49.999736 | −26.507133 | −50 |
| A4 = | 6.70817E−02 | −3.21951E−03 | −1.67293E−02 | −3.57695E−02 | −8.05324E−03 | −2.46949E−02 |
| A6 = | −2.51877E−02 | −8.35557E−03 | −2.58391E−02 | −1.03850E−04 | −1.64556E−03 | −3.89981E−04 |
| A8 = | 1.07147E−02 | 3.18708E−03 | 1.05980E−02 | 1.47975E−03 | −4.60149E−04 | −4.20092E−04 |
| A10 = | −2.47197E−03 | −2.48168E−03 | −1.20429E−03 | 1.49675E−03 | 1.07245E−05 | −2.02169E−04 |
| A12 = | | | | | | |
| A14 = | | | | | | |

| | Surface | | | | | |
|---|---|---|---|---|---|---|
| | 8 | 9 | 10 | 11 | 12 | 13 |
| k = | −7.9452 | −11.23503 | 0.175257 | −5.510902 | 0.64078 | 9.111766 |
| A4 = | −1.75019E−02 | −2.69778E−02 | −3.16741E−02 | −4.43712E−03 | −1.13742E−03 | −1.48195E−02 |
| A6 = | 3.00518E−04 | −6.25681E−04 | −2.91947E−03 | −1.15007E−03 | −5.89210E−03 | 5.53028E−04 |
| A8 = | −4.50460E−04 | −1.59611E−05 | −2.98554E−04 | −1.91341E−04 | 6.42119E−04 | −4.42995E−05 |
| A10 = | −1.47442E−04 | −2.67964E−05 | 1.38788E−04 | 2.53694E−05 | 6.93620E−05 | −1.66606E−06 |
| A12 = | | | 4.15319E−05 | 1.37306E−05 | −9.97836E−07 | 4.52906E−08 |
| A14 = | | | −1.11390E−05 | −1.36417E−06 | −7.19271E−07 | 1.43494E−09 |

In the third embodiment, the aspheric curve equation is displayed the same as the first embodiment. In addition, definitions of the parameters listed in the following table are the same as that of the first embodiment, and the unnecessary details are therefore no longer given herein.

According to tables 5 and 6 the following conditional parameters are found.

The third embodiment

| | | | |
|---|---|---|---|
| $|f/f1|$ | 0.7870 | InRS51 | −0.5629 |
| f1/ΣPP | 0.0481 | InRS52 | −1.0401 |
| f6/ΣNP | 0.1948 | InRS61 | −1.1390 |
| IN12/f | 0.1422 | InRS62 | −0.6823 |
| HOS/f | 1.3103 | Inf61 | 0 |

-continued

The third embodiment

| | | | |
|---|---|---|---|
| ΣPPR | 3.2008 | HVT61 | 0 |
| $|ΣNPR|$ | 2.9204 | Inf62 | 0.3371 |
| ΣPPR/$|ΣNPR|$ | 1.0960 | HVT62 | 1.8599 |
| (R11 − R12)/(R11 + R12) | 2.0843 | $|InRS52|$ | 1.4531 |
| HOS | 6.0 | $|InRS52|$ + $|InRS61|$ | 2.1790 |
| HOS/HOI | 1.5333 | Inf62/$|InRS62|$ | 0.2873 |
| InS/HOS | 0.9400 | Inf62/$|InRS62|$ | 0.2873 |
| InTL/HOS | 0.8079 | HVT62/HOI | 0.4753 |
| ΣTP/InTL | 0.6445 | HVT62/HOS | 0.3100 |
| (TP1 + IN12)/TP2 | 6.7527 | HVT62/(Inf62 + CT6) | 2.5888 |
| (TP6 + IN56)/TP5 | 0.9643 | $|TDT|$ | 1.0485% |
| (TP2 + TP3 + TP4)/ΣTP | 0.5156 | $|ODT|$ | 2.0110% |

The Fourth Embodiment

Figure 4A:
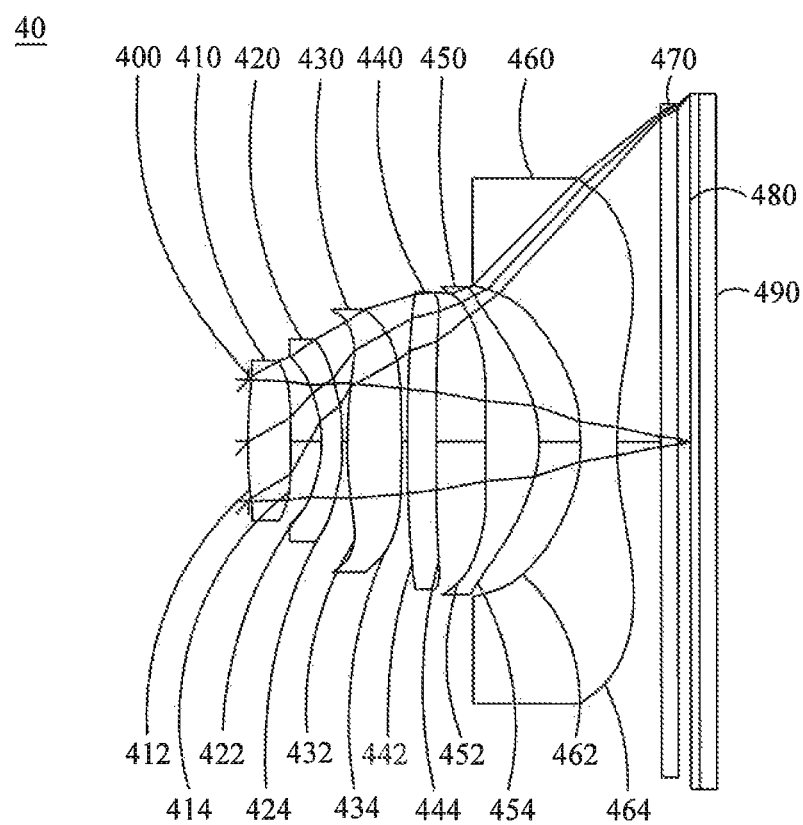
FIG. 4A is a schematic diagram of the fourth embodiment of an optical image capturing system according to the present invention.
Figure 4B:
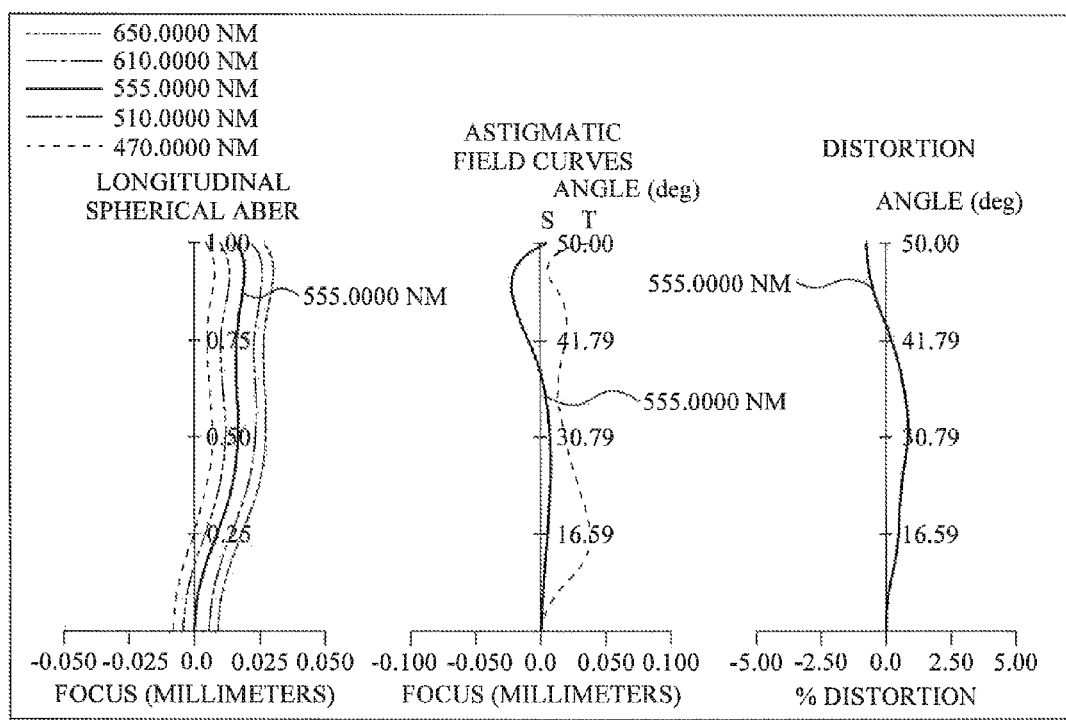
FIG. 4B is curve diagrams of longitudinal spherical aberration, astigmatic field curves and optical distortion of the fourth embodiment of an optical image capturing system according to the present invention from left to right.
Figure 4C:
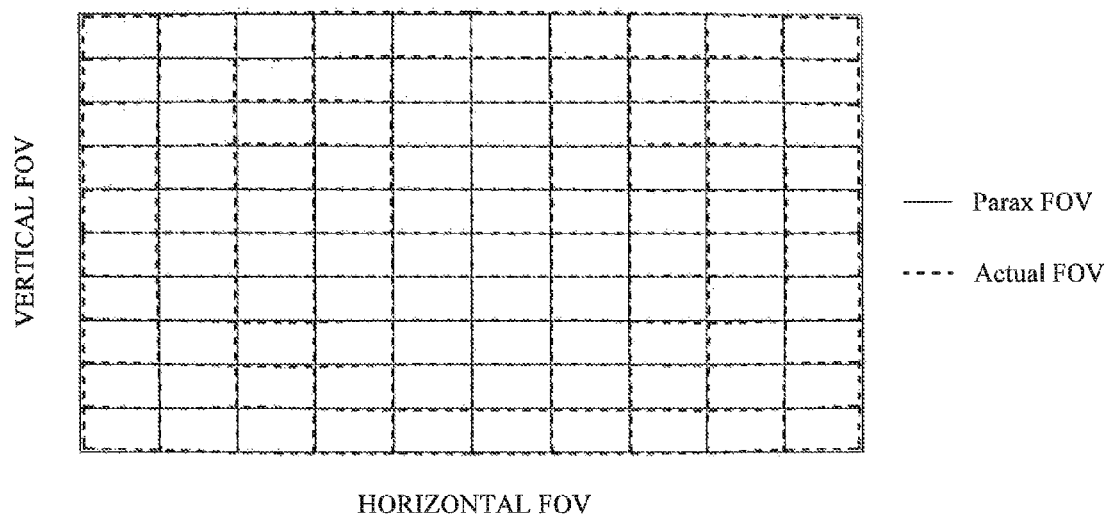
FIG. 4C is a curve diagram of TV distortion grid of the fourth embodiment of an optical image capturing system according to the present invention.

Please refer to FIGS. 4A and 4B which are a schematic diagram of the fourth embodiment of an optical image capturing system according to the present invention and curve diagrams of longitudinal spherical aberration, astigmatic field curves and optical distortion of the fourth embodiment of an optical image capturing system according to the present invention from left to right, respectively. FIG. 4C is a curve diagram of TV distortion grid of the fourth embodiment of an optical image capturing system according to the present invention. It can be found through FIG. 4A that the optical image capturing system, in order from an object side to an image side comprises an aperture 400, a first lens 410, a second lens 420, a third lens 430, a fourth lens 440, a fifth lens 450, a sixth lens 460, an IR filter 470, an image-plane 480 and an image sensing element 490.

The first lens 410 has positive refractive power, and is made of plastic material; object-side surface 412 is convex and image-side surface 414 is convex and both are aspheric The second lens 420 has negative refractive power, and is made of plastic material; object-side surface 422 is concave and image-side surface 424 is convex and both are aspheric.

The third lens 430 has positive refractive power, and is made of plastic material; object-side surface 432 is convex and image-side surface 434 is convex and both are aspheric.

The fourth lens 440 has positive refractive power, and is made of plastic material; object-side surface 442 is convex and image-side surface 444 is concave and both are aspheric.

The fifth lens 450 has positive refractive power, and is made of plastic material; object-side surface 452 is convex and image-side surface 454 is convex and both are aspheric, and the object-side surface 452 has inflection points.

The sixth lens 460 has negative refractive power, and is made of plastic material; object-side surface 462 is concave and image-side surface 464 is concave and both are aspheric, and the image-side 464 surface has inflection points.

The IR filter 470 is made of glass, and is disposed between the sixth lens 460 and the image-plane 480 without affecting the focal length of the optical image capturing system.

In the fourth embodiment of the optical image capturing system, focal lengths of the second 420 to the fifth 450 lenses are respectively f2, f3, f4 and f5, and the following conditions are satisfied: |f2|+|f3|+|f4|+|f5|=113.2609 mm; |f1|+|f6|=6.9629 mm; and |f2|+|f3|+|f4|+|f5|>|f1|+|f6|.

In the fourth embodiment of the optical image capturing system, a thickness of the fifth lens 450 on the optical axis is TP5, a thickness of the sixth lens 460 on the optical axis is TP6, and the following conditions are satisfied: TP5=0.5829 mm; and TP6=0.4028 mm.

In the fourth embodiment of the optical image capturing system, the first 410, the third 430, the fourth 440 and the fifth 450 are all positive lenses; the focal lengths are respectively f1, f3, f4 and f5, a sum of focal lengths of all the lenses having positive refractive power is ΣPP, and the following conditions are satisfied: ΣPP=f1+f3+f4+f5=112.3138 mm; and f1/(f1+f3+f4+f5)=0.0470. Therefore, it is able to adequately distribute the positive refractive power of the first lens 410 to the other positive lenses to suppress the obvious aberration occurring too early in the process of incident light traveling.

In the fourth embodiment of the optical image capturing system, focal lengths of the second 420 and the sixth 460 lenses are respectively f2 and f6, a sum of focal lengths of all the lenses having negative refractive power is ΣNP, and the following conditions are satisfied: ΣNP=f2+f6=−7.9099 mm; and f6/(f2+f6)=0.2133. Therefore, it contributes to distributing the negative refractive power of the sixth lens 460 to the other negative lenses.

In the fourth embodiment of the optical image capturing system, a vertical distance between a critical point of the object-side surface 452 of the fifth lens and the optical axis is HVT51, a vertical distance between the critical point of the image-side surface 454 of the fifth lens and the optical axis is HVT52, and the following conditions are satisfied: HVT51=0.3040 mm; HVT52=0 mm. A horizontal translation distance from an intersection point of the object-side surface 452 of the fifth lens on the optical axis to an inflection point of the object-side surface 452 of the fifth lens on the optical axis is Inf51, a horizontal translation distance from an intersection point of the image-side surface 454 of the fifth lens on the optical axis to an inflection point of the image-side surface 454 of the fifth lens on the optical axis is Inf52, and the following conditions are satisfied: Inf51=0.0006 mm; Inf52=0 mm.

Please refer to the following table 7 along with table 8.

TABLE 7

The lens parameter of the fourth embodiment
Table 7. The fourth embodiment
f(focal length) = 3.29344 mm; f/HEP = 2.4; HAF(half FOV) = 50 deg; tan(HAF) = 1.1918

| Surface | | Curvature radius | Thickness | Material | Refractive Index | Abbe # | Focal length |
|---|---|---|---|---|---|---|---|
| 0 | To-be-shot object | Plano | INFINITY | | | | |
| 1 | Aperture | Plano | −0.00684 | | | | |
| 2 | First lens | 3.97578 | 0.483259 | Plastic | 1.565 | 58 | 5.2755 |
| 3 | | −11.5295 | 0.344813 | | | | |
| 4 | Second lens | −1.42731 | 0.23 | Plastic | 1.65 | 21.4 | −6.22255 |
| 5 | | −2.3358 | 0.05 | | | | |
| 6 | Third lens | 3.02225 | 0.628311 | Plastic | 1.565 | 58 | 4.53961 |
| 7 | | −16.0061 | 0.05 | | | | |
| 8 | Fourth lens | 25.50234 | 0.326887 | Plastic | 1.565 | 58 | 100 |
| 9 | | 46.1488 | 0.566853 | | | | |
| 10 | Fifth lens | 38.69807 | 0.5829 | Plastic | 1.607 | 26.6 | 2.49871 |
| 11 | | −1.58063 | 0.473791 | | | | |
| 12 | Sixth lens | −1.76233 | 0.402823 | Plastic | 1.65 | 21.4 | −1.68735 |
| 13 | | 3.23819 | 0.5 | | | | |
| 14 | IR filter | Plano | 0.2 | | 1.517 | 64.2 | |
| 15 | | Plano | 0.116018 | | | | |
| 16 | Image-plane | Plano | 0.016927 | | | | |

Reference wavelength (d-line) is 555 nm

TABLE 8

The aspheric coefficient of the fourth embodiment
Table 8. The aspheric coefficient

| | Surface | | | | | |
|---|---|---|---|---|---|---|
| | 2 | 3 | 4 | 5 | 6 | 7 |
| k = | 4.055623 | 28.821253 | 0.486642 | −3.085723 | −31.51925 | 48.960235 |
| A4 = | −5.37700E−02 | −7.34739E−02 | 1.87624E−01 | 3.34216E−02 | 3.90152E−04 | −4.68979E−02 |
| A6 = | −1.35996E−02 | −8.79962E−02 | −2.79912E−01 | −6.68140E−02 | −1.77561E−02 | −3.18990E−03 |
| A8 = | −3.62743E−02 | 5.61642E−02 | 2.86997E−01 | 4.73396E−02 | 1.06212E−03 | 5.24508E−05 |
| A10 = | −1.88346E−02 | −8.63993E−02 | −1.69451E−01 | −2.60550E−02 | −3.81820E−03 | −2.04625E−03 |
| A12 = | | | | | | |
| A14 = | | | | | | |

| | Surface | | | | | |
|---|---|---|---|---|---|---|
| | 8 | 9 | 10 | 11 | 12 | 13 |
| k = | −25.911874 | −50 | −50 | −0.767309 | −0.008001 | −10.337418 |
| A4 = | 2.18150E−03 | 5.13773E−03 | −7.14985E−02 | 1.77140E−02 | 3.69278E−02 | −1.60135E−02 |
| A6 = | 1.55065E−03 | 1.88969E−03 | 1.22018E−02 | 8.80222E−04 | 1.00995E−02 | 6.56862E−04 |
| A8 = | 6.74790E−04 | 4.27282E−04 | −7.84665E−04 | 1.03814E−03 | −1.01854E−02 | −2.05268E−05 |
| A10 = | −2.60290E−04 | −8.95322E−04 | −2.40109E−04 | 1.40165E−04 | 1.83712E−03 | −2.72275E−06 |
| A12 = | | | −1.76769E−05 | −8.77338E−06 | 3.65006E−04 | −1.51322E−07 |
| A14 = | | | −4.16118E−05 | −2.16103E−05 | −8.98571E−05 | −1.92028E−09 |

In the fourth embodiment, the aspheric curve equation is displayed the same as the first embodiment. In addition, definitions of the parameters listed in the following table are the same as that of the first embodiment, and the unnecessary details are therefore no longer given herein.

Accord to tables 7 and 8 the following conditional parameters are found.

| The fourth embodiment | | | |
|---|---|---|---|
| |f/f1| | 0.6243 | InRS51 | −0.4018 |
| f1/ΣPP | 0.0470 | InRS52 | −0.7847 |
| f6/ΣNP | 0.2133 | InRS61 | −1.2085 |
| IN12/f | 0.1047 | InRS62 | −0.4500 |
| HOS/f | 1.5098 | Inf61 | 0 |
| ΣPPR | 2.7008 | HVT61 | 0 |
| |ΣNPR| | 2.4811 | Inf62 | 0.1889 |
| ΣPPR/|ΣNPR| | 1.0885 | HVT62 | 1.7210 |
| (R11 − R12)/(R11 + R12) | −3.3882 | |InRS52|/TP5 | 1.3462 |
| HOS | 4.9726 | |InRS52| + |InRS61| | 1.9932 |
| HOS/HOI | 1.2708 | |InRS62|/TP6 | 1.1170 |
| InS/HOS | 0.9986 | Inf62/|InRS62| | 0.4198 |
| InTL/HOS | 0.8325 | HVT62/HOI | 0.4398 |
| ΣTP/InTL | 0.6412 | HVT62/HOS | 0.3461 |
| (TP1 + IN12)/TP2 | 3.6003 | HVT62/(Inf62 + CT6) | 2.9084 |
| (TP6 + IN56)/TP5 | 1.5039 | |TDT| | 1.5371% |
| (TP2 + TP3 + TP4)/ΣTP | 0.5795 | |ODT| | 0.8470% |

The Fifth Embodiment

Figure 5A:
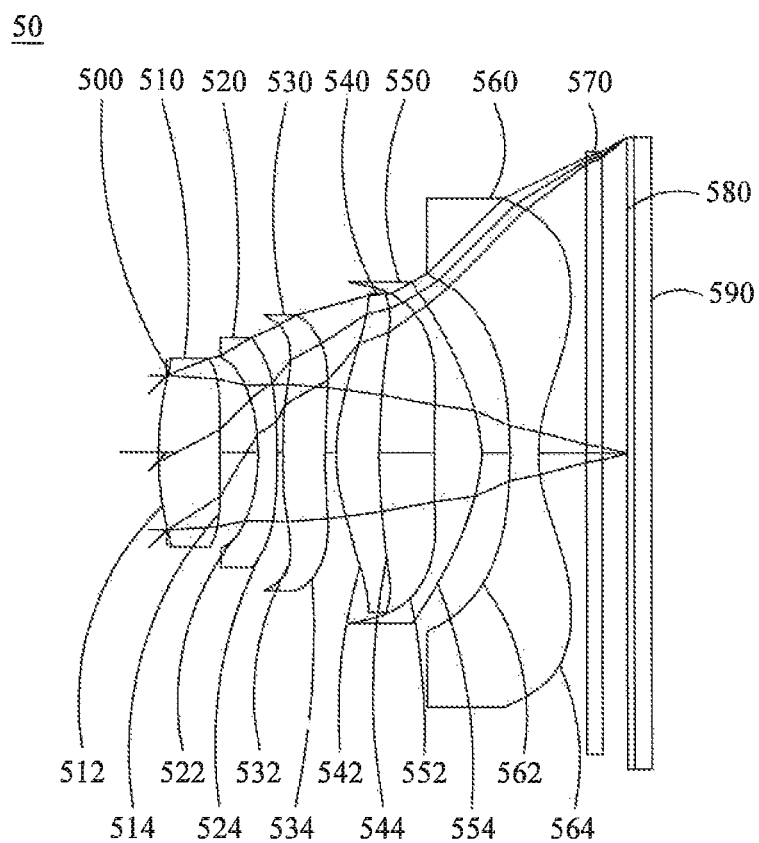
FIG. 5A is a schematic diagram of the fifth embodiment of an optical image capturing system according to the present invention.
Figure 5B:
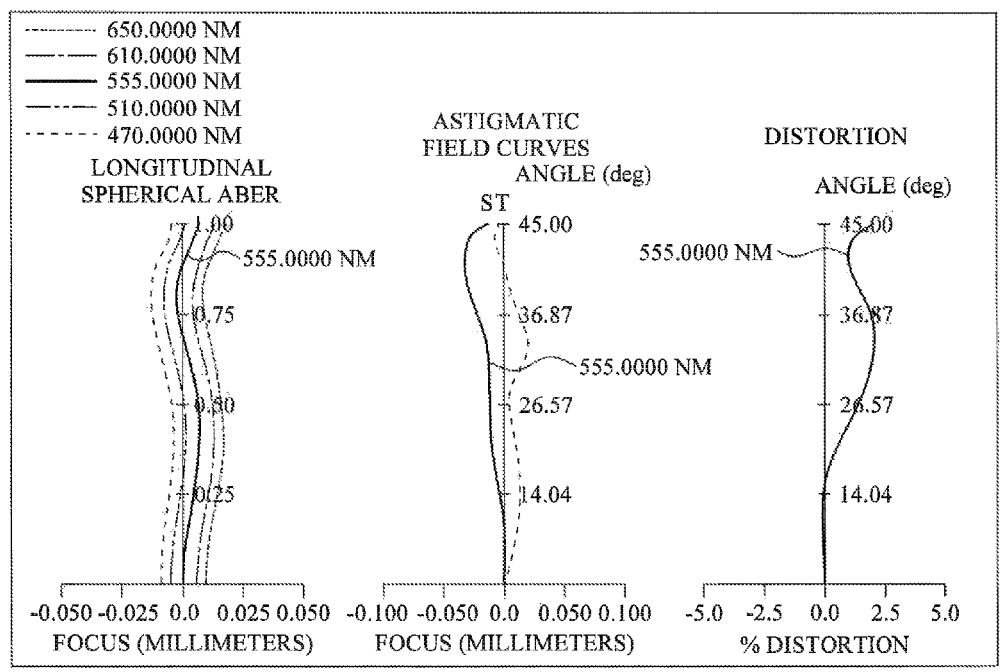
FIG. 5B is curve diagrams of longitudinal spherical aberration, astigmatic field curves and optical distortion of the fifth embodiment of an optical image capturing system according to the present invention from left to right.
Figure 5C:
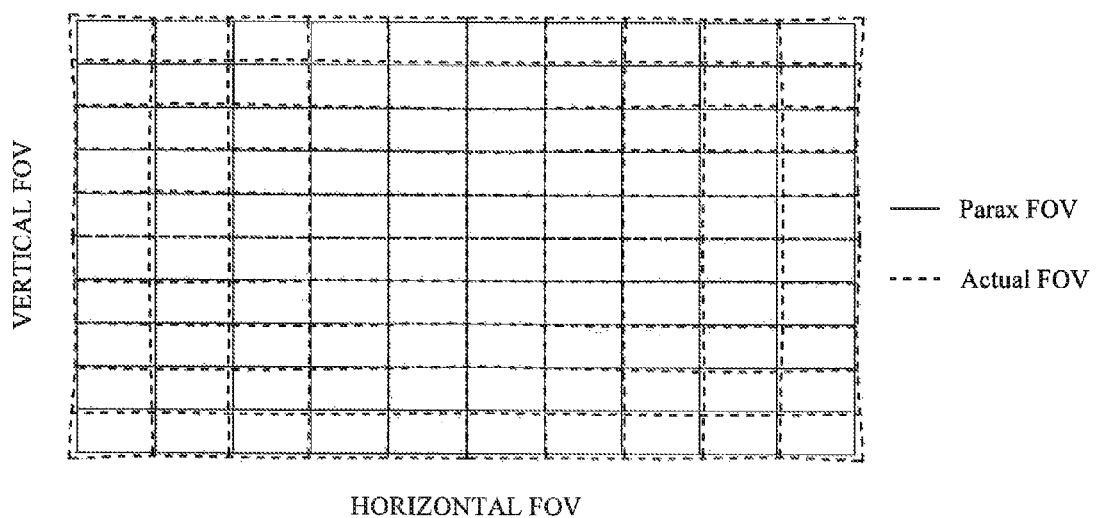
FIG. 5C is a curve diagram of TV distortion grid of the fifth embodiment of an optical image capturing system according to the present invention.

Please refer to FIGS. 5A and 5B which are a schematic diagram of the fifth embodiment of an optical image capturing system according to the present invention and curve diagrams of longitudinal spherical aberration, astigmatic field curves and optical distortion of the fifth embodiment of an optical image capturing system according to the present invention from left to right, respectively. FIG. 5C is a curve diagram of TV distortion grid of the fifth embodiment of an optical image capturing system according to the present invention. It can be found through FIG. 5A that the optical image capturing system, in order from an object side to an image side comprises an aperture 500, a first lens 510, a second lens 520, a third lens 530, a fourth lens 540, a fifth lens 550, a sixth lens 560, an IR filter 570, an image-plane 580 and an image sensing element 590.

The first lens 510 has positive refractive power, and is made of plastic material; object-side surface 512 is convex and image-side surface 514 is convex and both are aspheric The second lens 520 has negative refractive power, and is made of plastic material; object-side surface 522 is concave and image-side surface 524 is convex and both are aspheric.

The third lens 530 has positive refractive power, and is made of plastic material; object-side surface 532 is convex and image-side surface 534 is concave and both are aspheric.

The fourth lens 540 has positive refractive power, and is made of plastic material; object-side surface 542 is convex and image-side surface 544 is concave and both are aspheric.

The fifth lens 550 has positive refractive power, and is made of plastic material; object-side surface 552 is convex and image-side surface 554 is convex and both are aspheric.

The sixth lens 560 has negative refractive power, and is made of plastic material; object-side surface 562 is concave and image-side surface 564 is concave and both are aspheric, and the object-side surface 562 and the image-side 564 surface both have inflection points.

The IR filter 570 is made of glass, and is disposed between the sixth lens 560 and the image-plane 580 without affecting the focal length of the optical image capturing system.

In the fifth embodiment of the optical image capturing system, focal lengths of the second 520 to the fifth 550 lenses are respectively f2, f3, f4 and f5, and the following conditions are satisfied: |f2|+|f3|+|f4|+|f5|=33.0030 mm; |f1|+|f6|=7.6011 mm; and |f2|+|f3|+|f4|+|f5|>|f1|+|f6|.

In the fifth embodiment of the optical image capturing system, a thickness of the fifth lens 550 on the optical axis is TP5, a thickness of the sixth lens 560 on the optical axis is TP6, and the following conditions are satisfied: TP5=0.6000 mm; and TP6=0.3457 mm.

In the fifth embodiment of the optical image capturing system, the first 510, the third 530, the fourth 540 and the fifth 550 are all positive lenses; the focal lengths are respectively f1, f3, f4 and f5, a sum of focal lengths of all the lenses having positive refractive power is ΣPP, and the following conditions are satisfied: ΣPP=f1+f3+f4+f5=33.2552 mm; and f1/(f1+f3+f4+f5)=0.1786. Therefore, it is able to adequately distribute the positive refractive power of the first lens 510 to the other positive lenses to suppress the obvious aberration occurring too early in the process of incident light traveling.

In the fifth embodiment of the optical image capturing system, focal lengths of the second 520 and the sixth 560 lenses are respectively f2 and f6, a sum of focal lengths of all the lenses having negative refractive power is ΣNP, and the following conditions are satisfied: ΣNP=f2+f6=−7.3489 mm; and f6/(f2+f6)=0.2260. Therefore, it contributes to distributing the negative refractive power of the sixth lens 560 to the other negative lenses.

In the fifth embodiment of the optical image capturing system, a vertical distance between a critical point of the object-side surface 552 of the fifth lens and the optical axis is HVT51, a vertical distance between the critical point of the image-side surface 554 of the fifth lens and the optical axis is HVT52, and the following conditions are satisfied: HVT51=0.8161 mm; HVT52=0 mm. A horizontal translation distance from an intersection point of the object-side surface 552 of the fifth lens on the optical axis to an inflection point of the object-side surface 552 of the fifth lens on the optical axis is Inf51, a horizontal translation distance from an intersection point of the image-side surface 554 of the fifth lens on the optical axis to an inflection point of the image-side surface 554 of the fifth lens on the optical axis is Inf52, and the following conditions are satisfied: Inf51=0.0202 mm; Inf52=0 mm.

Please refer to the following table 9 along with table 10.

TABLE 9

The lens parameter of the fifth embodiment
Table 9. The fifth embodiment
f(focal length) = 3.83421; f/HEP = 2.0; HAF(half FOV) = 45 deg; tan(HAF) = 1

| Surface | | Curvature radius | Thickness | Material | Refractive Index | Abbe # | Focal length |
|---|---|---|---|---|---|---|---|
| 0 | To-be-shot object | Plano | INFINITY | | | | |
| 1 | Aperture | Plano | −0.10356 | | | | |
| 2 | First lens | 3.57498 | 0.758312 | Plastic | 1.565 | 58 | 5.94055 |
| 3 | | −53.4333 | 0.471758 | | | | |
| 4 | Second lens | −2.4984 | 0.230001 | Plastic | 1.65 | 21.4 | −5.68833 |
| 5 | | −7.84943 | 0.06734 | | | | |
| 6 | Third lens | 4.1449 | 0.523309 | Plastic | 1.565 | 54 | 18.5342 |
| 7 | | 6.53253 | 0.132353 | | | | |
| 8 | Fourth lens | 2.50246 | 0.528856 | Plastic | 1.565 | 58 | 6.63655 |
| 9 | | 6.90473 | 0.670149 | | | | |
| 10 | Fifth lens | 8.53489 | 0.600003 | Plastic | 1.607 | 26.6 | 2.14391 |
| 11 | | −1.50648 | 0.353614 | | | | |
| 12 | Sixth lens | −4.02388 | 0.345731 | Plastic | 1.632 | 23.4 | −1.66054 |
| 13 | | 1.48248 | 0.6 | | | | |
| 14 | IR filter | Plano | 0.2 | | 1.517 | 64.2 | |
| 15 | | Plano | 0.308573 | | | | |
| 16 | Image-plane | Plano | 0.003698 | | | | |

Reference wavelength (d-line) is 555 nm

TABLE 10

The aspheric coefficient of the fifth embodiment
Table 10. The aspheric coefficient

| | Surface | | | | | |
|---|---|---|---|---|---|---|
| | 2 | 3 | 4 | 5 | 6 | 7 |
| k = | −20.307921 | 49.908153 | −4.229147 | 24.583356 | −25.001967 | −12.821488 |
| A4 = | 4.44977E−02 | −2.58174E−02 | −2.32121E−02 | −4.27728E−03 | −2.25266E−03 | −4.58218E−02 |
| A6 = | −4.06523E−02 | −2.32404E−02 | −4.35672E−02 | −9.33349E−03 | −8.64103E−03 | −7.95743E−03 |
| A8 = | 2.23651E−02 | 5.79528E−03 | −3.43492E−03 | −8.54537E−03 | 2.93351E−03 | 5.21564E−03 |
| A10 = | −1.03457E−02 | −7.19697E−03 | −2.37846E−03 | 3.12035E−03 | −1.93581E−03 | −1.55447E−03 |
| A12 = | | | | | | |
| A14 = | | | | | | |

| | Surface | | | | | |
|---|---|---|---|---|---|---|
| Surface | 8 | 9 | 10 | 11 | 12 | 13 |
| k = | −6.774694 | −49.998611 | −1.786825 | −6.078994 | −42.290606 | −7.2226 |
| A4 = | 3.66103E−03 | −3.75054E−03 | −3.85058E−02 | −1.26197E−02 | −2.98305E−02 | −1.03214E−02 |
| A6 = | −3.04655E−03 | 1.80365E−03 | −6.88251E−03 | 4.01272E−04 | 1.04354E−02 | −7.55628E−04 |
| A8 = | 6.25305E−05 | 1.88218E−04 | 1.53477E−03 | 3.26186E−04 | −3.87970E−03 | 1.12212E−04 |
| A10 = | 2.11192E−05 | −2.07381E−04 | 2.77274E−04 | −7.46187E−06 | −8.64244E−05 | −3.71575E−07 |
| A12 = | | | 1.07215E−05 | −2.08707E−05 | 2.16119E−04 | −9.76374E−07 |
| A14 = | | | −2.87685E−05 | 2.63986E−06 | −2.60452E−05 | 2.29272E−08 |

In the fifth embodiment, the aspheric curve equation is displayed the same as the first embodiment. In addition, definitions of the parameters listed in the following table are the same as that of the first embodiment, and the unnecessary details are therefore no longer given herein.

According to tables 9 and 10 the following conditional parameter are found.

| The fifth embodiment | | | |
|---|---|---|---|
| \|f/f1\| | 0.6454 | InRS51 | −0.5345 |
| f1/ΣPP | 0.1786 | InRS52 | −0.8717 |
| f6/ΣNP | 0.2260 | InRS61 | −1.0372 |
| IN12/f | 0.1230 | InRS62 | −0.4084 |
| HOS/f | 1.5111 | Inf61 | 0 |
| ΣPPR | 3.2185 | HVT61 | 0 |
| \|ΣNPR\| | 2.9831 | Inf62 | 0.4094 |
| ΣPPR/\|ΣNPR\| | 1.0789 | HVT62 | 2.0010 |
| (R11 − R12)/(R11 + R12) | 2.1667 | \|InRS52\|/TP5 | 1.4528 |
| HOS | 5.7937 | \|InRS52\| + \|InRS61\| | 1.9089 |
| HOS/HOI | 1.4805 | \|InRS62\|/TP6 | 1.1812 |
| InS/HOS | 0.9821 | Inf62/\|InRS62\| | 1.0024 |
| InTL/HOS | 0.8080 | HVT62/HOI | 0.5113 |
| ΣTP/InTL | 0.6379 | HVT62/HOS | 0.3454 |
| (TP1 + IN12)/TP2 | 5.3481 | HVT62/(Inf62 + CT6) | 2.6499 |
| (TP6 + IN56)/TP5 | 1.1656 | \|TDT\| | 1.1188% |
| (TP2 + TP3 + TP4)/ΣTP | 0.5533 | \|ODT\| | 2.0752% |

Although the present invention has been disclosed in the preceding descriptions, it is not used to limit the present invention. Any person skilled in the art is able to modify and retouch it without departing from the scope and spirit of the invention. Therefore, the protected scope of the present invention is defined on the basis of the following claims.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. An optical image capturing system, in order from an object side to an image side comprising:
    a first lens with positive refractive power;
    a second lens with negative refractive power;
    a third lens with positive refractive power;
    a fourth lens with positive refractive power;
    a fifth lens with positive refractive power;
    a sixth lens with negative refractive power, and at least one of an object-side surface and an image-side surface thereof having at least one inflection point; and
    an image-plane;
    wherein the optical image capturing system has six lenses having refractive power, at least one of the second lens to the fifth lens has positive refractive power, an object-side surface and an image-side surface of the first lens are aspheric, and both an object-side surface and an image-side surface of the sixth lens are aspheric, focal lengths from the first lens to the sixth lens are respectively f1, f2, f3, f4, f5 and f6, focal length of the optical image capturing system is f, an entrance pupil diameter of the optical image capturing system is HEP, a half of the maximal view angle of the optical image capturing system is HAF, a distance from the object-side surface of the first lens to the image-plane is HOS, and the following conditions are satisfied: 0≤\|f/f1\|≤2; 1.2≤f/HEP≤2.8; 0.4≤\|tan(HAF)\|≤1.5; and 1.3≤HOS/f≤1.7.

2. The optical image capturing system of claim 1, wherein the optical image capturing system is satisfied with the following formula: \|f2\|+\|f3\|+\|f4\|+\|f5\|>\|f1\|+\|f6\|.

3. The optical image capturing system of claim 1, wherein when the optical image capturing system is imaging, TV distortion is TDT, and the following condition is satisfied: \|TDT\|<1.5%.

4. The optical image capturing system of claim 3, wherein when the optical image capturing system is imaging, optical distortion is ODT, and the following condition is satisfied: \|ODT\|≤2.5%.

5. The optical image capturing system of claim 1, wherein a distance from the object-side surface of the first lens to the image-side surface of the sixth lens is InTL, a distance from the object-side surface of the first lens to the image-plane is HOS, and the following condition is satisfied: 0.6≤InTL/HOS≤0.95.

6. The optical image capturing system of claim 1, wherein on the optical axis, a total thickness of all the lenses having refractive power is ΣTP, a distance from the object-side surface of the first lens to the image-side surface of the sixth lens is InTL, and the following condition is satisfied: 0.45≤ΣTP/InTL≤0.95.

7. The optical image capturing system of claim 1, wherein a horizontal translation distance from an intersection point of the image-side surface of the sixth lens on the optical axis to the maximal effective diameter position of the image-side surface of the sixth lens on the optical axis is InRS62, a thickness of the sixth lens on the optical axis is TP6, and the following condition is satisfied: 0<\|InRS62\|/TP6≤3.

8. The optical image capturing system of claim 1, further comprising an aperture, wherein on the optical axis, a distance from the aperture to the image-plane is InS, and the following condition is satisfied: 0.6≤InS/HOS≤1.1.

9. The optical image capturing system of claim 8, further comprising an image sensing element disposed on the image-plane, a half of a diagonal line of an effective detection field of the image sensing element is HOI, and the following condition is satisfied: HOS/HOI≤3.

10. An optical image capturing system, in order from an object side to an image side comprising:
    a first lens with positive refractive power;
    a second lens with negative refractive power;
    a third lens with positive refractive power;
    a fourth lens with positive refractive power;
    a fifth lens with positive refractive power;
    a sixth lens with negative refractive power, and at least one of an object-side surface and an image-side surface thereof having at least one inflection point; and
    an image-plane;
    wherein the optical image capturing system has six lenses having refractive power, at least one of the third lens to the sixth lens has positive refractive power, an object-side surface and an image-side surface of the first lens are aspheric, and both an object-side surface and an image-side surface of the sixth lens are aspheric, focal lengths from the first lens to the sixth lens are respectively f1, f2, f3, f4, f5 and f6, focal length of the optical image capturing system is f, an entrance pupil diameter of the optical image capturing system is HEP, a half of the maximal view angle of the optical image capturing system is HAF, a distance from the object-side surface of the first lens to the image-plane is HOS, when the optical image capturing system is imaging, TV distortion and optical distortion are respectively TDT and ODT, and the following conditions are satisfied: 0≤\|f/f1\|≤2; 1.2≤f/HEP≤2.8; 0.4≤\|tan(HAF)\|≤1.5; 1.3≤HOS/f≤1.7; \|TDT\|<1.5%; and \|ODT\|≤2.5%.

11. The optical image capturing system of claim 10, wherein the third lens, the fourth lens and the fifth lens have positive refractive power.

12. The optical image capturing system of claim 10, wherein a horizontal translation distance from an intersection point of the image-side surface of the sixth lens on the optical axis to the maximal effective diameter position of the image-side surface of the sixth lens on the optical axis is InRS62, a thickness of the sixth lens on the optical axis is TP6, and the following condition is satisfied: $0<|InRS62|/TP6 \leq 3$.

13. The optical image capturing system of claim 12, wherein a position of the inflection point of the image-side surface of the sixth lens projecting vertically to the optical axis is a reference point, a horizontal translation distance from the intersection point of the image-side surface of the sixth lens on the optical axis to the reference point is Inf62, and the following condition is satisfied: $0<Inf62/|InRS62| \leq 120$.

14. The optical image capturing system of claim 10, wherein a horizontal translation distance from an intersection point of the image-side surface of the fifth lens on the optical axis to the maximal effective diameter position of the image-side surface of the fifth lens on the optical axis is InRS52, a thickness of the fifth lens on the optical axis is TP5, and the following condition is satisfied: $0<|InRS52|/TP5 \leq 5$.

15. The optical image capturing system of claim 10, wherein the image-side surface of the sixth lens has at least one critical point C crossing with a tangent plane vertical to the optical axis, a vertical distance from the critical point C to the optical axis is HVT62, and the following condition is satisfied: $0<HVT62/HOS \leq 1$.

16. The optical image capturing system of claim 10, wherein a horizontal translation distance from the intersection point of the image-side surface of the sixth lens on the optical axis to the maximal effective diameter position of the image-side surface of the sixth lens on the optical axis is InRS61, a horizontal translation distance from the intersection point of the image-side surface of the fifth lens on the optical axis to the maximal effective diameter position of the image-side surface of the fifth lens on the optical axis is InRS52, and the following condition is satisfied: $0 \text{ mm}<|InRS52|+|InRS61| \leq 5 \text{ mm}$.

17. The optical image capturing system of claim 10, wherein on the optical axis, a total thickness of all the lenses having refractive power is ΣTP, a thickness of the third lens on the optical axis is TP3, a thickness of the fourth lens on the optical axis is TP4, a thickness of the fifth lens on the optical axis is TP5, and the following condition is satisfied: $0<(TP3+TP4+TP5)/\Sigma TP \leq 0.85$.

18. The optical image capturing system of claim 10, wherein a distance between the first lens and the second lens on the optical axis is IN12, and the following condition is satisfied: $0<IN12/f \leq 0.25$.

19. The optical image capturing system of claim 10, wherein a distance between the first lens and the second lens on the optical axis is IN12, a thickness of the first lens on the optical axis is TP1, a thickness of the second lens on the optical axis is TP2, and the following condition is satisfied: $1 \leq (TP1+IN12)/TP2 \leq 10$.

20. An optical image capturing system, in order from an object side to an image side comprising:
a first lens with positive refractive power having a convex object-side surface close to the optical axis;
a second lens with negative refractive power;
a third lens with positive refractive power;
a fourth lens with positive refractive power;
a fifth lens with positive refractive power;
a sixth lens with negative refractive power, and at least one of an object-side surface and an image-side surface thereof having at least one inflection point; and
an image-plane;
wherein the optical image capturing system has six lenses having refractive power, both an object-side surface and an image-side surface of the first lens are aspheric, and both an object-side surface and an image-side surface of the sixth lens are aspheric, focal lengths from the first lens to the sixth lens are respectively f1, f2, f3, f4, f5 and f6, focal length of the optical image capturing system is f, an entrance pupil diameter of the optical image capturing system is HEP, a half of the maximal view angle of the optical image capturing system is HAF, a distance from the object-side surface of the first lens to the image-plane is HOS, and when the optical image capturing system is imaging, optical distortion is ODT and TV distortion is TDT, and the following conditions are satisfied: $0 \leq |f/f1| \leq 2$; $1.2 \leq f/HEP \leq 2.8$; $0.4 \leq |tan(HAF)| \leq 1.5$; $1.3 \leq HOS/f \leq 1.7$; $|TDT|<1.5\%$; and $|ODT| \leq 2.5\%$.

21. The optical image capturing system of claim 20, wherein a ratio f/fp between focal length f of the optical image capturing system and a focal length fp of each lens having positive refractive power is PPR, a ratio f/fn between focal length f of the optical image capturing system and a focal length fp of each lens having negative refractive power is NPR, a sum of the PPR of all the lenses having positive refractive power is ΣPPR, a sum of the NPR of all the lenses having negative refractive power is ΣNPR, and the following condition is satisfied: $0.5 \leq \Sigma PPR/|\Sigma NPR| \leq 2.5$.

22. The optical image capturing system of claim 20, wherein a horizontal translation distance from an intersection point of the image-side surface of the sixth lens on the optical axis to the maximal effective diameter position of the image-side surface of the sixth lens on the optical axis is InRS62, a thickness of the sixth lens on the optical axis is TP6, a horizontal translation distance from an intersection point of the image-side surface of the fifth lens on the optical axis to the maximal effective diameter position of the image-side surface of the fifth lens on the optical axis is InRS52, a thickness of the fifth lens on the optical axis is TP5, the image-side surface of the sixth lens has at least one critical point C crossing with a tangent plane vertical to the optical axis, a vertical distance from the critical point C to the optical axis is HVT62, and the following conditions are satisfied: $0<|InRS62|/TP6 \leq 3$; $0<|InRS52|/TP5 \leq 5$; and $0<HVT62/HOS \leq 1$.

23. The optical image capturing system of claim 20, further comprising an aperture, an image-plane and an image sensing element, wherein the image sensing element is disposed on the image-plane, a distance from the aperture on the optical axis to the image-plane is InS, a distance from the object-side surface of the first lens to the image-plane is HOS, and the following condition is satisfied: $0.6 \leq InS/HOS \leq 1.1$.

24. The optical image capturing system of claim 23, wherein length, width and diagonal line of the image sensing element are respectively L, B and Dg, and the following condition is satisfied: $Dg \leq 1/1.2$ inch, and $L/B=16/9$.

25. The optical image capturing system of claim 23, wherein at least 8 million pixels are disposed on the image sensing element, size of the pixel is PS, and the following condition is satisfied: $PS \leq (1.4 \text{ μm})^2$.

* * * * *